(12) United States Patent
Ahmadi et al.

(10) Patent No.: US 12,651,157 B2
(45) Date of Patent: Jun. 9, 2026

(54) METHODS AND SYSTEMS FOR GENERATING THE GRADIENTS OF A LOSS FUNCTION WITH RESPECT TO THE WEIGHTS OF A CONVOLUTION LAYER

(71) Applicant: Imagination Technologies Limited, Kings Langley (GB)

(72) Inventors: Aria Ahmadi, London (GB); Cagatay Dikici, London (GB)

(73) Assignee: Imagination Technologies Limited, Kings Langley (GB)

( * ) Notice: Subject to any disclaimer, the term of this patent is extended or adjusted under 35 U.S.C. 154(b) by 1104 days.

(21) Appl. No.: 17/699,090

(22) Filed: Mar. 19, 2022

(65) Prior Publication Data

US 2022/0351036 A1    Nov. 3, 2022

(30) Foreign Application Priority Data

Mar. 19, 2021    (GB) ..................................... 2103863

(51) Int. Cl.
*G06N 3/08* (2023.01)

(52) U.S. Cl.
CPC ..................................... *G06N 3/08* (2013.01)

(58) Field of Classification Search
CPC .......... G06N 3/08; G06N 3/045; G06N 3/084; G06N 3/063; G06F 17/153; G06F 17/16
See application file for complete search history.

(56) References Cited

U.S. PATENT DOCUMENTS 10,706,350 B1 *   7/2020   Tran ..................... G06N 3/0464
2021/0157876 A1   5/2021   Martin et al.

FOREIGN PATENT DOCUMENTS

GB    2582352 A    9/2020
GB    2582353 A    9/2020
GB    2592087 A    8/2021

OTHER PUBLICATIONS

Zlateski et al., "ZNN—A Fast and Scalable Algorithm for Training 3D Convolutional Networks on Multi-core and Many-Core Shared Memory Machines," 2016, IEEE International Parallel and Distributed Processing Symposium (IPDPS), pp. 801-811 (Year: 2016).*

(Continued)

*Primary Examiner* — Alexey Shmatov
*Assistant Examiner* — Kyu Hyung Han
(74) *Attorney, Agent, or Firm* — Potomac Law Group, PLLC; Vincent M DeLuca

(57)    ABSTRACT

Methods and systems of generating gradients of a loss metric for a neural network (NN) with respect to weights of a convolution layer of the NN, the convolution layer of the NN configured to receive an input tensor of input values and a weight tensor of weights, and generate an output tensor of output values. The methods comprise performing, using hardware logic, a group convolution between a first y-dimensional tensor and a second z-dimensional tensor wherein $z=y+1$, the first y-dimensional tensor being formed of a set of values from the input tensor, and the second z-dimensional tensor being formed of a set of values from an output gradient tensor comprising gradients of the loss metric for the NN with respect to the output values; wherein the first y-dimensional tensor, the second z-dimensional tensor and the group convolutions are configured to generate an output of a convolution operation between each channel of the set of values of the input tensor and each channel of the set of values of the output gradient tensor.

19 Claims, 28 Drawing Sheets

(56) References Cited

OTHER PUBLICATIONS

Sauer C., "Extending Convolution into the Z-Dimension Experimenting with Uniting Convolution over Scale and Multi-Scale Features", 2016, Stanford University Computer Science, pp. 1-8 (Year: 2016).*

Roger S., "Using the NumPy Reshape and NumPy Flatten in Python", Mar. 18, 2021, H2K Infosys, pp. 1-14, https://www.h2kinfosys.com/blog/numpy-reshape-and-numpy-flatten-in-python/#cntx (Year: 2021).*

Cheng C., "Fast 2D Convolution Algorithms for Convolutional Neural Networks", 2020, IEEE Transactions on Circuits and Systems, vol. 67, No. 5, pp. 1678-1691 (Year: 2020).*

Wang et al., "Fully Learnable Group Convolution for Acceleration of Deep Neural Networks", 2019, arXiv, p. 9049-9058 (Year: 2019).*

Rochette et al; "Efficient Per-Example Gradient Computations in Convolutional Neural Networks"; arXiv:1912.06015v1 [cs.LG] Dec. 12, 2019; pp. 1-10.

Rochette et al., "Efficient Per-Example Gradient Computations in Convolutional Neural Networks," Theory and Practice of Differential Privacy (TPDP) workshop at CCS 2020, Dec. 2019.

Gonda et al; "Parallel Separable 3D Convolution for Video and Volumetric Data Understanding"; Sep. 11, 2018; pp. 1-12.

Venkataramanaiah et al; "Automatic Compiler Based FPGA Accelerator for CNN Training"; 2019 29th International Conference on Field Programmable Logic and Applications; Sep. 8, 2019; pp. 166-172.

* cited by examiner

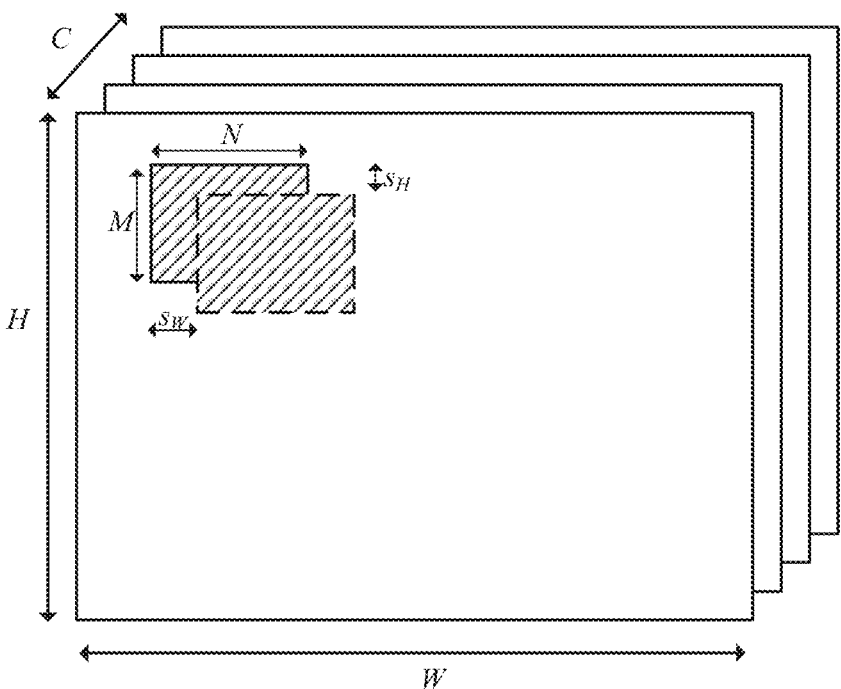
FIG. 2

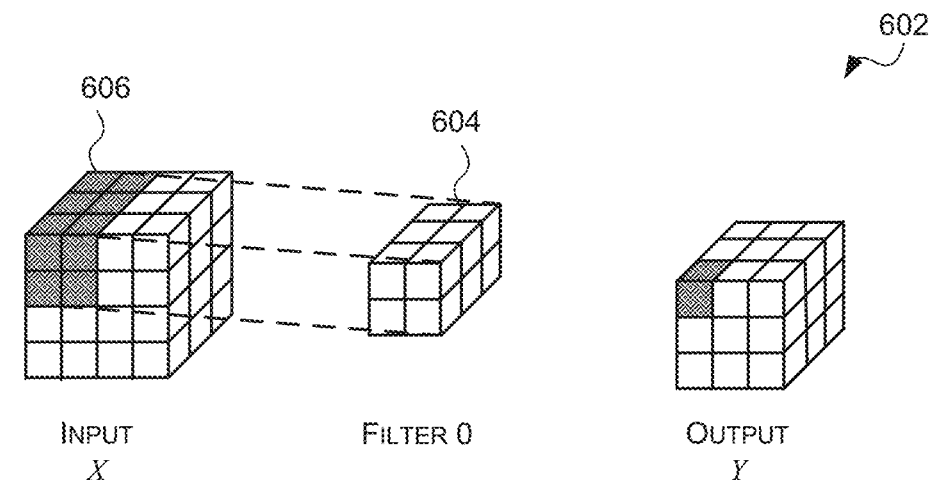
602
606 604
INPUT
X
FILTER 0
OUTPUT
Y
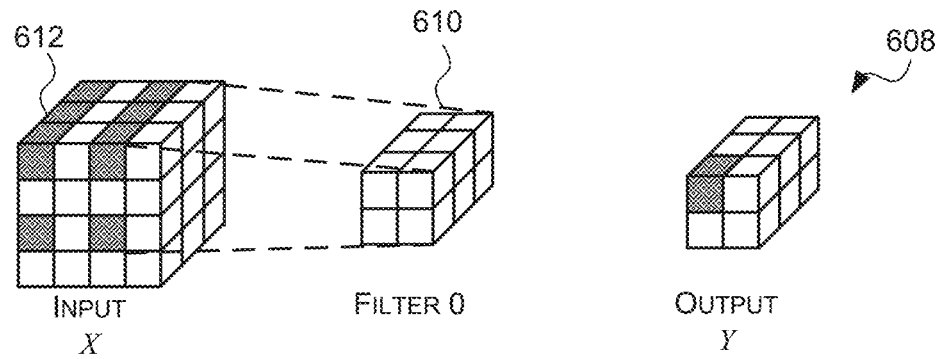
608
612 610
INPUT
X
FILTER 0
OUTPUT
Y
FIG. 6

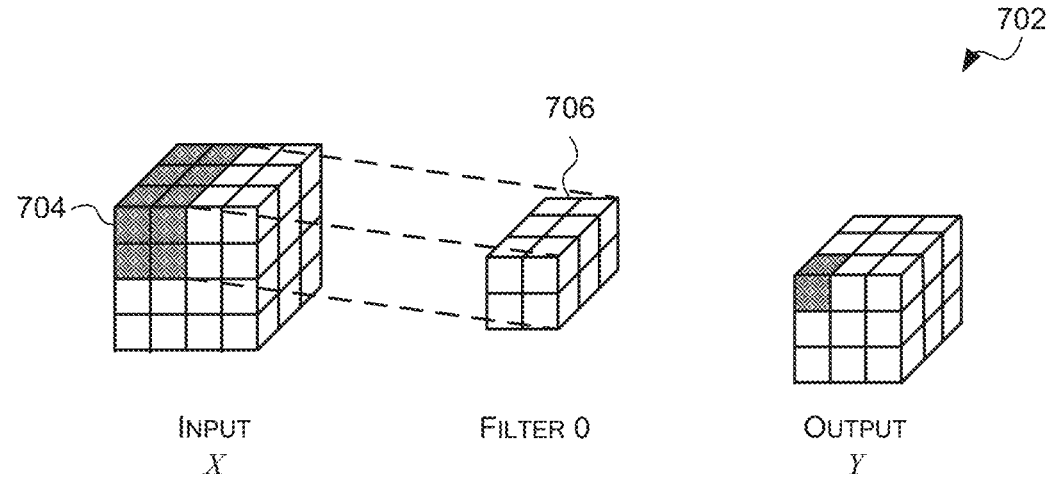
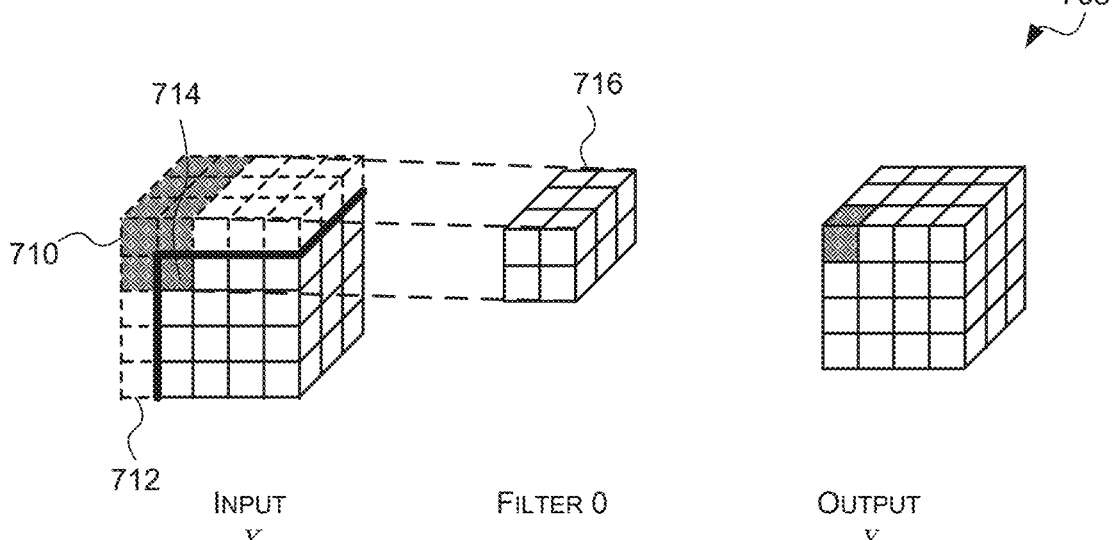
FIG. 7

900

REFORMAT ONE OR BOTH OF THE INPUT MATRIX $X$ AND THE OUTPUT GRADIENT MATRIX $G$                                          904

PERFORM A GROUP CONVOLUTION BETWEEN THE VALUES OF THE INPUT MATRIX $X$ AND THE GRADIENTS OF THE OUTPUT GRADIENT MATRIX $G$                                          902

REFORMAT THE OUTPUT OF THE GROUP CONVOLUTION TO GENERATE THE WEIGHT GRADIENT MATRIX $B$                                          906

1900

REPRESENT 3D CONVOLUTION AS A SET OF 2D CONVOLUTIONS AND SUMMATIONS 1902

PERFORM THE METHOD OF FIG. 9 FOR EACH 2D CONVOLUTION 1904

COMBINE GROUP CONVOLUTION OUTPUTS THAT RELATE TO THE SAME WEIGHTS 1906

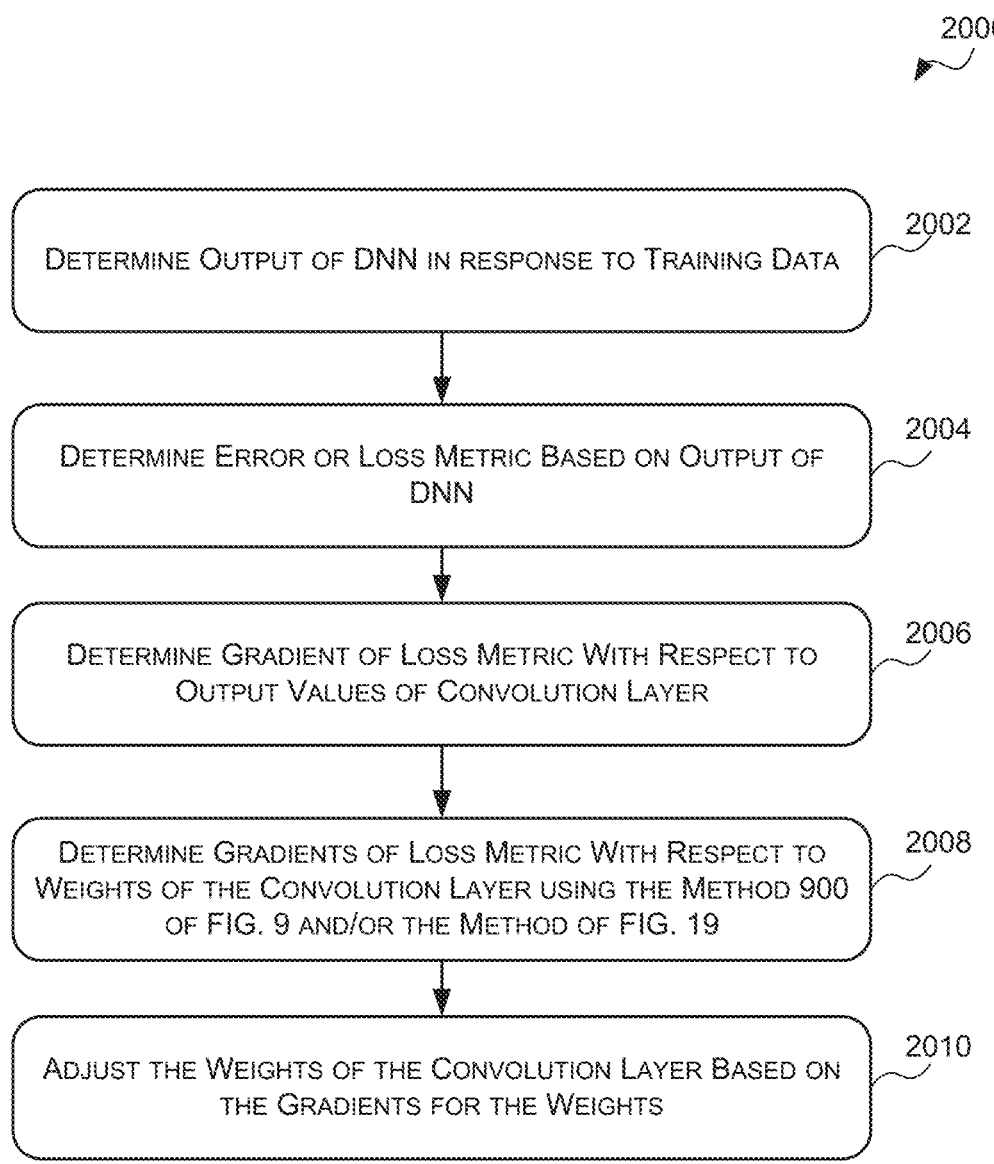

2000

2002
DETERMINE OUTPUT OF DNN IN RESPONSE TO TRAINING DATA

2004
DETERMINE ERROR OR LOSS METRIC BASED ON OUTPUT OF DNN

2006
DETERMINE GRADIENT OF LOSS METRIC WITH RESPECT TO OUTPUT VALUES OF CONVOLUTION LAYER

2008
DETERMINE GRADIENTS OF LOSS METRIC WITH RESPECT TO WEIGHTS OF THE CONVOLUTION LAYER USING THE METHOD 900 OF FIG. 9 AND/OR THE METHOD OF FIG. 19

2010
ADJUST THE WEIGHTS OF THE CONVOLUTION LAYER BASED ON THE GRADIENTS FOR THE WEIGHTS

FIG. 20

CONVOLUTION TRANSPOSE
(STRIDE 2)

CONVOLUTION TRANSPOSE (STRIDE 2)

METHODS AND SYSTEMS FOR GENERATING THE GRADIENTS OF A LOSS FUNCTION WITH RESPECT TO THE WEIGHTS OF A CONVOLUTION LAYER

TECHNICAL FIELD

This application relates to methods, systems, and hardware logic for generating the gradients of a loss function with respect to the weights of a convolution layer of a neural network.

BACKGROUND

A Deep Neural Network (DNN) is a form of artificial neural network comprising a plurality of interconnected layers that can be used for machine learning applications. In particular, a DNN can be used in signal processing applications, including, but not limited to, image processing and computer vision applications. FIG. 1 illustrates an example DNN 100 that comprises a plurality of layers 102, 104, 106. Each layer 102, 104, 106 receives input data, and processes the input data in accordance with the layer to produce output data. The output data is either provided to another layer as the input data, or is output as the final output data of the DNN. For example, in the DNN 100 of FIG. 1, the first layer 102 receives the original input data 108 to the DNN 100, and processes the input data in accordance with the first layer 102 to produce output data 110. The output data 110 of the first layer 102 becomes the input data to the second layer 104, and the second layer 104 processes the input data 110 in accordance with the second layer 104 to produce output data 112. The output data 112 of the second layer 104 becomes the input data to the third layer 106, and the third layer 106 processes the input data 112 in accordance with the third layer 106 to produce output data 114. The output data 114 of the third layer 106 is then output as the final output data of the DNN. Where the DNN is used for classification, the output data 114 may be a vector of length A, wherein A is the number of classes and each value in the vector represents the probability of a certain class.

Reference is made to FIG. 2 which illustrates an example overview of the format of data 200 utilised in a DNN. As can be seen in FIG. 2, the data 200 used in a DNN may be formed of a plurality of planes. For example, the input data may be arranged as C planes of data, where each plane has a dimension H×W. Each plane may be referred to as a channel of the data.

The processing that is performed on the input data to a layer depends on the type of layer. For example, each layer of a DNN may be one of a plurality of different types. Example DNN layer types include, but are not limited to, a convolution layer, an activation layer, a normalisation layer, a pooling layer, and a fully connected layer. It will be evident to a person of skill in the art that these are example DNN layer types and that this is not an exhaustive list and there may be other DNN layer types.

A convolution layer convolves the input data with weights associated with the layer. Specifically, each convolution layer is associated with a plurality of weights $k_0 \ldots k_g$, which may also be referred to as filter weights or coefficients. The weights are grouped to form, or define, one or more filters or kernels, and each filter may be associated with an offset bias bias. Each filter may have a dimension M×N×C (i.e. each filter may comprise a set of M×N×C weights k) and may be applied to the input data according to a convolution operation across steps $s_W$ and $s_H$ in the W and H directions. The step sizes $s_W$ and $s_H$ may be referred to as the strides of the convolution. The number of filters and/or the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function receives an input tensor and performs a certain non-linear mathematical operation on each value or element in the input tensor. In other words, the activation function operates on each value or element in the input tensor separately. In some examples, an activation layer may act as rectified linear unit (ReLU) by implementing an ReLU function (i.e. $f(x)=\max(0, x)$) or a Parametric Rectified Linear Unit (PReLU) by implementing a PReLU function.

A normalisation layer is configured to perform a normalising function, such as a Local Response Normalisation (LRN) Function on the input data. A pooling layer, which is typically, but not necessarily inserted between successive convolution layers, performs a pooling function, such as a max, min or average function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs a vector of length A. Where the DNN is used for classification, A may be the number of classes, and each value in the vector may represent the probability of a certain class. The vector of length A is generated through a matrix multiplication of a set of weights, optionally followed by a bias offset. A fully connected layer thus receives a set of weights and a bias.

Accordingly, each layer of a DNN receives input data values and generates output data values; and some layers (such as, but not limited to, convolution layers and fully-connected layers) also receive weights and/or biases.

A DNN can be configured to perform a specific function by learning the weights through a training process. Training is often performed through a technique referred to as back-propagation which is illustrated in FIG. 3. Specifically, to train a DNN via back-propagation, a model of the DNN 302 is configured to use a particular set of weights, training data is then applied to the model, and the output F of the model in response to the training data is recorded. This is referred to as performing a forward pass of the DNN and is shown generally at 304 of FIG. 3. A differentiable error or loss metric, E, is then calculated from the recorded output F which quantitatively indicates the performance of the DNN using that particular set of weights. The derivative of the error or loss metric, E, is then back-propagated, via the chain rule and the partial derivative rule, to the weights, K, of each layer the DNN to produce gradients, or derivatives of, the loss or error metric, E, with respect to each weight, $$\frac{\partial E}{\partial K(m, n, c, l)}$$

(see 306 of FIG. 3). Although only a single convolution layer 308 is shown in FIG. 3 it will be evident to a person of skill in the art that this is used as an example only and that the gradient or derivative of the loss or error metric, E, with respect to each weight of each layer may be determined. The weights are then adjusted based on the gradients so as to reduce the loss or error metric E. This process may be repeated until the loss or error metric E converges.

The embodiments described below are provided by way of example only and are not limiting of implementations which solve any or all of the disadvantages of methods and systems for training a DNN.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for generating gradients of a loss metric for a neural network (NN) with respect to weights of a convolution layer of the NN, the convolution layer of the NN is configured to receive an input tensor of input values, a weight tensor of weights and generate an output tensor of output values. The methods comprise performing, using hardware logic, a group convolution between a first y-dimensional tensor and a second z-dimensional tensor, the first y-dimensional tensor being formed of a set of values from the input tensor, and the second z-dimensional tensor being formed of a set of values from an output gradient tensor comprising gradients of the loss metric for the NN with respect to the output values; wherein the first y-dimensional tensor, the second z-dimensional tensor and the group convolution are configured to generate an output of a convolution operation between each channel of the set of values of the input tensor and each channel of the set of values of the output gradient tensor.

A first aspect provides a computer-implemented method of generating gradients of a loss metric for a neural network (NN) with respect to weights of a convolution layer of the NN, the convolution layer of the NN configured to receive an input tensor of input values and a weight tensor of weights, and generate an output tensor of output values, the method comprising: performing, using hardware logic, a group convolution between a first y-dimensional tensor and a second z-dimensional tensor wherein z=y+1, the first y-dimensional tensor being formed of a set of values from the input tensor, and the second z-dimensional tensor being formed of a set of values from an output gradient tensor comprising gradients of the loss metric for the NN with respect to the output values; wherein the first y-dimensional tensor, the second z-dimensional tensor and the group convolution are configured to generate an output of a convolution operation between each channel of the set of values of the input tensor and each channel of the set of values of the output gradient tensor.

A stride of the convolution layer may be a dilation of the group convolution, and a dilation of the convolution layer may be a stride of the group convolution.

The first y-dimensional tensor may comprise C channels, C being a number of channels of the set of values of the input tensor, and each channel of the first y-dimensional tensor may correspond to a channel of the set of values of the input tensor.

The first y-dimensional tensor may be the set of values of the input tensor.

The second z-dimensional tensor may comprise C*L filters that comprises C copies of each channel of the set of values of the output gradient tensor, C may be a number of channels of the set of values of the input tensor, and L may be a number of channels of the set of values of the output tensor.

The second z-dimensional tensor may comprises C*L filters, the $i^{th}$ filter may comprise the $k^{th}$ channel of the set of values of the output gradient tensor, i may be any integer in the set 0 to C*L−1, C may be a number of channels of the set of values of the input tensor, L may be a number of channels of the set of values of the output tensor, and k may be equal to i modulo L.

The method may further comprise generating the second z-dimensional tensor by: receiving the set of values of the output gradient tensor; expanding the set of values of the output gradient tensor to a z-dimensional tensor of filters by making each a channel of the set of values of the output gradient tensor a separate filter; and generating the second z-dimensional tensor by tiling the z-dimensional tensor of filters C times in the filter dimension such that the second z-dimensional tensor comprises C*L filters.

The method may further comprise reshaping an output of the group convolution to generate a reshaped tensor, wherein reshaping a tensor of o dimensions comprises converting the tensor into a reshaped tensor of o+1 dimensions by splitting a dimension of the tensor.

The first y-dimensional tensor may comprise C*L channels that comprises L copies of each channel of the set of values of the input tensor, C may be a number of channels of the set of values of the input tensor, and L may be a number of channels of the set of values of the output gradient tensor.

The first y-dimensional tensor may comprise C*L channels and the $g^{th}$ channel comprises the $h^{th}$ channel of the set of values of the input tensor, g may be any integer in the set 0 to (C*L)−1, C may be a number of channels in the set of values of the input tensor, L may be a number of channels in the set of values of the output gradient tensor, and h may be g modulo L.

The method may further comprise generating the first y-dimensional tensor by tiling the set of values of the input tensor L times along a channel dimension.

The second z-dimensional tensor may comprise C*L filters that comprise C copies of each channel of the set of values of the output gradient tensor.

The second z-dimensional tensor may comprise C*L filters and the $i^{th}$ filter may comprise the $k^{th}$ channel of the set of values of the output gradient tensor, i may be any integer in the set 0 to (C*L)−1, and k may be equal to $$\left\lfloor \frac{i}{C} \right\rfloor.$$

The method may further comprise generating the second z-dimensional tensor by: receiving the set of values of the output gradient tensor; expanding the set of values of the output gradient tensor to a z-dimensional tensor of filters by making each channel of the set of values of the output gradient tensor a separate filter; and generating the second z-dimensional tensor by repeating each filter of the z-dimensional tensor of filters C times in the filter dimension such that the second z-dimensional tensor comprises C*L filters.

The method may further comprise reshaping the output of the group convolution to generate a reshaped tensor, wherein reshaping a tensor of o dimensions comprises converting the tensor into a reshaped tensor of o+1 dimensions by splitting a dimension of the tensor.

The convolution layer may implement a 2D convolution, the input tensor may be three-dimensional, the output tensor may be three-dimensional, y may be three, and z may be four.

The convolution layer may implement a 1D convolution, the first y-dimensional tensor may be generated from values of the input tensor with a dummy dimension, and the second z-dimensional tensor may be generated from values of the weight tensor with a dummy dimension.

The convolution layer may implement a ZD convolution and Z is greater than or equal to three, and the method may further comprise: representing the ZD convolution as a set of 2D convolutions and summations, each 2D convolution processing a slice of the input tensor and a slice of the weight tensor and contributing to a slice of the output tensor; performing the group convolution for each 2D convolution, wherein the set of values of the input tensor comprises the values of the input tensor corresponding to the slice of the input tensor processed by the 2D convolution, and the set of values of the output gradient tensor comprises the values of the output gradient tensor corresponding to the slice of the output tensor to which the 2D convolution contributes; and combining the output of the group convolutions in which the corresponding 2D convolutions process the same slice of the weight tensor.

The hardware logic may comprise one or more convolution engines.

The group convolution may be performed using the one or more convolution engines.

The hardware logic may comprise a neural network accelerator.

A second aspect provides a method of training a neural network, the method comprising: determining an output of the NN in response to training data; determining a loss metric based on the output of the NN; determining gradients of the loss metric with respect to the output values of a convolution layer of the NN; determining the gradients of the loss metric with respect to weights of the convolution layer in accordance with the method of the first aspect and adjusting the weights of the convolution layer based on the gradients of the loss metric with respect to the weights.

The method may further comprise configuring hardware to implement the NN using the adjusted weights.

Determining the gradients of the loss metric with respect to the output values of the convolution layer of the NN may comprise generating an input gradient tensor for a second convolution layer of the NN that follows the convolution layer in the NN, the input gradient tensor comprising gradients of the loss metric with respect to input data values of an input tensor for the second convolution layer by: dividing each filter of a weight tensor K of the second convolution layer into a plurality of sub-filters; performing a convolution operation between each sub-filter and an output gradient tensor for the second convolution layer to generate a sub-output tensor; and interleaving elements of the sub-output tensors related to the same filter to generate a channel of the input gradient tensor.

A third aspect provides hardware logic for generating gradients of a loss metric for a deep neural network (NN) with respect to weights of a convolution layer of the NN, the convolution layer of the NN configured to receive an input tensor of input values and a weight tensor of weights, and generate an output tensor of output values, the hardware logic configurable to: perform a group convolution between a first y-dimensional tensor and a second z-dimensional tensor wherein z=y+1, the first y-dimensional tensor being formed of a set of the values from the input tensor, and the second z-dimensional tensor being formed of a set of values from an output gradient tensor comprising gradients of the loss metric of the NN with respect to the output values; wherein the first y-dimensional tensor, the second z-dimensional tensor and the group convolution are configured to generate an output of a convolution operation between each channel of the set of values of the input tensor and each channel of the set of values of the output gradient tensor.

The hardware logic may comprise a neural network accelerator.

The hardware logic may be configurable to process a forward pass of the neural network.

A fourth aspect provides a system for training a neural network (NN), the system comprising hardware logic configurable to: determine an output of the NN in response to training data; determine a loss metric based on the output of the NN; determine gradients of the loss metric with respect to the output values of a convolution layer of the NN; determine the gradients of the loss metric with respect to weights of the convolution layer in accordance with the method of the first aspect; and adjust the weights of the convolution layer based on the gradients of the loss metric with respect to the weights.

The hardware logic may comprise a neural network accelerator configurable to determine the output of the NN in response to training data; determine the gradients of the loss metric with respect to the output values of the convolution layer; and/or determine the gradients of the loss metric with respect to the weights of the convolution layer.

A fifth aspect provides a method of generating, at a computer system comprising a neural network accelerator, gradients of a loss metric for a neural network (NN) with respect to weights of a convolution layer of the NN, the convolution layer of the NN configured to receive an input tensor of input values and a weight tensor of weights, and generate an output tensor of output values, the method comprising: performing, using a plurality of convolution engines of the neural network accelerator, a group convolution between a first y-dimensional tensor and a second z-dimensional tensor wherein z=y+1, the first y-dimensional tensor being formed of a set of values from the input tensor, and the second z-dimensional tensor being formed of a set of values from an output gradient tensor comprising gradients of the loss metric for the NN with respect to the output values, each convolution engine of the plurality of convolution engines being dedicated hardware configured to perform convolution operations; wherein the first y-dimensional tensor, the second z-dimensional tensor and the group convolution are configured to generate an output of a convolution operation between each channel of the set of values of the input tensor and each channel of the set of values of the output gradient tensor.

Generating the gradients via a group convolution between the first y-dimensional tensor and the second z-dimensional tensor allows the gradient generation to be divided into a plurality of distinct sub-convolutions which each can be processed by a separate convolution engine. This can result in a more hardware efficient method of determining the gradients on a computer system that comprises a neural network accelerator with a plurality of convolution engines as it allows multiple sub-convolutions to be processed in parallel. Accordingly, the described methods are particularly adapted for a specific hardware implementation, i.e. a computer system with a neural network accelerator that comprises a plurality of convolution engines, to make more efficient use of the technical components of the computer system.

A sixth aspect provides a neural network accelerator for generating gradients of a loss metric for a deep neural network (NN) with respect to weights of a convolution layer of the NN, the convolution layer of the NN configured to receive an input tensor of input values and a weight tensor of weights, and generate an output tensor of output values, the neural network accelerator comprising: a plurality of convolution engines configured to perform a group convolution between a first y-dimensional tensor and a second z-dimensional tensor wherein $z=y+1$, the first y-dimensional tensor being formed of a set of values from the input tensor, and the second z-dimensional tensor being formed of a set of values from an output gradient tensor comprising gradients of the loss metric of the NN with respect to the output values, each convolution engine of the plurality of convolution engines being dedicated hardware configured to perform convolution operations; wherein the first y-dimensional tensor, the second z-dimensional tensor and the group convolution are configured to generate an output of a convolution operation between each channel of the set of values of the input tensor and each channel of the set of values of the output gradient tensor.

A seventh aspect provides a computer readable storage medium having stored thereon computer readable instructions that, when executed at a computer system comprising a neural network accelerator with a plurality of convolution engines, cause the computer system to perform the method of the fifth aspect.

The methods described herein may be used to train neural networks to process image data; and, once trained, to process image data. For example, the methods described herein may be used to train a neural network to perform an image processing or computer vision application.

Hardware logic configurable to implement a DNN (e.g. DNN accelerator) described herein may be embodied in hardware on an integrated circuit. There may be provided a method of manufacturing, at an integrated circuit manufacturing system, the hardware logic configurable to implement a DNN (e.g. DNN accelerator). There may be provided an integrated circuit definition dataset that, when processed in an integrated circuit manufacturing system, configures the system to manufacture the hardware logic configurable to implement a DNN (e.g. DNN accelerator). There may be provided a non-transitory computer readable storage medium having stored thereon a computer readable description of hardware logic configurable to implement a DNN (e.g. DNN accelerator) that, when processed in an integrated circuit manufacturing system, causes the integrated circuit manufacturing system to manufacture an integrated circuit embodying hardware logic configurable to implement a DNN (e.g. DNN accelerator).

There may be provided an integrated circuit manufacturing system comprising: a non-transitory computer readable storage medium having stored thereon a computer readable description of hardware logic configurable to implement a DNN (e.g. DNN accelerator); a layout processing system configured to process the computer readable description so as to generate a circuit layout description of an integrated circuit embodying the hardware logic configurable to implement a DNN (e.g. DNN accelerator); and an integrated circuit generation system configured to manufacture the hardware logic configurable to implement a DNN (e.g. DNN accelerator) according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 2 is a schematic diagram of example data in a DNN;

FIG. 6 is a schematic diagram illustrating the dilation of a convolution;

FIG. 7 is a schematic diagram illustrating the padding of a convolution;

FIG. 20 is a flow diagram of an example method of training a DNN using the method of FIG. 9;

Figure 1:
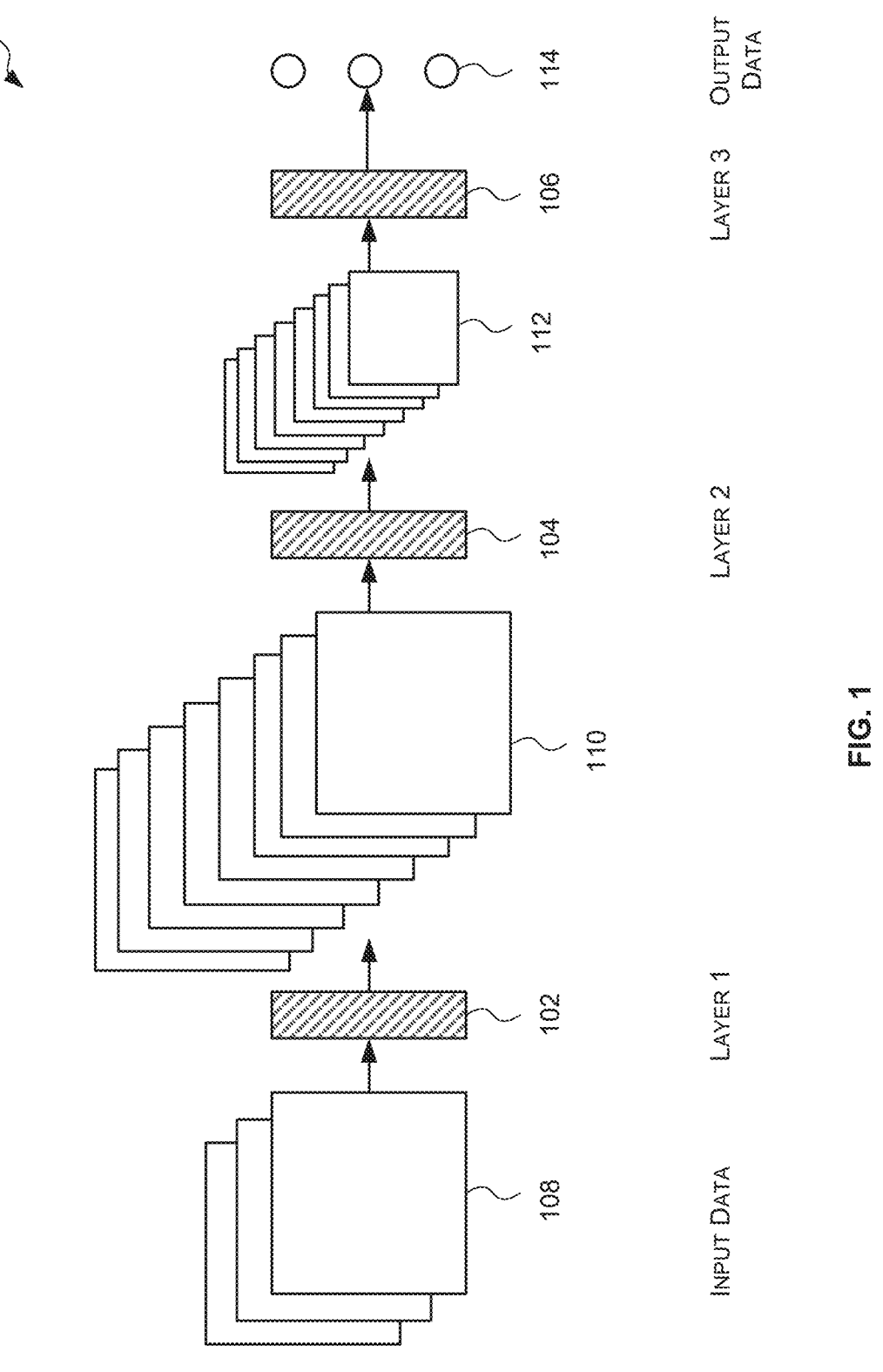
FIG. 1 is a schematic diagram of an example deep neural network (DNN)

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, training a DNN via back-propagation involves configuring a model of the DNN 302 to use a particular set of weights, applying training data to the model 302, and recording the output F of the model in response to the training data. This is referred to as performing a forward pass of the DNN which is shown generally at 304 of FIG. 3. A differentiable error or loss metric E is then calculated from the recorded output F which quantitatively indicates the performance of the DNN using that particular set of weights. The derivative of the loss or error metric E is then back-propagated, via the chain rule and the partial derivative rule, to the weights K of each layer of the DNN to produce gradients, or derivatives, of the loss or error metric E with respect to each weight $$\frac{\partial E}{\partial K(m, n, c, l)}$$

Figure 3:
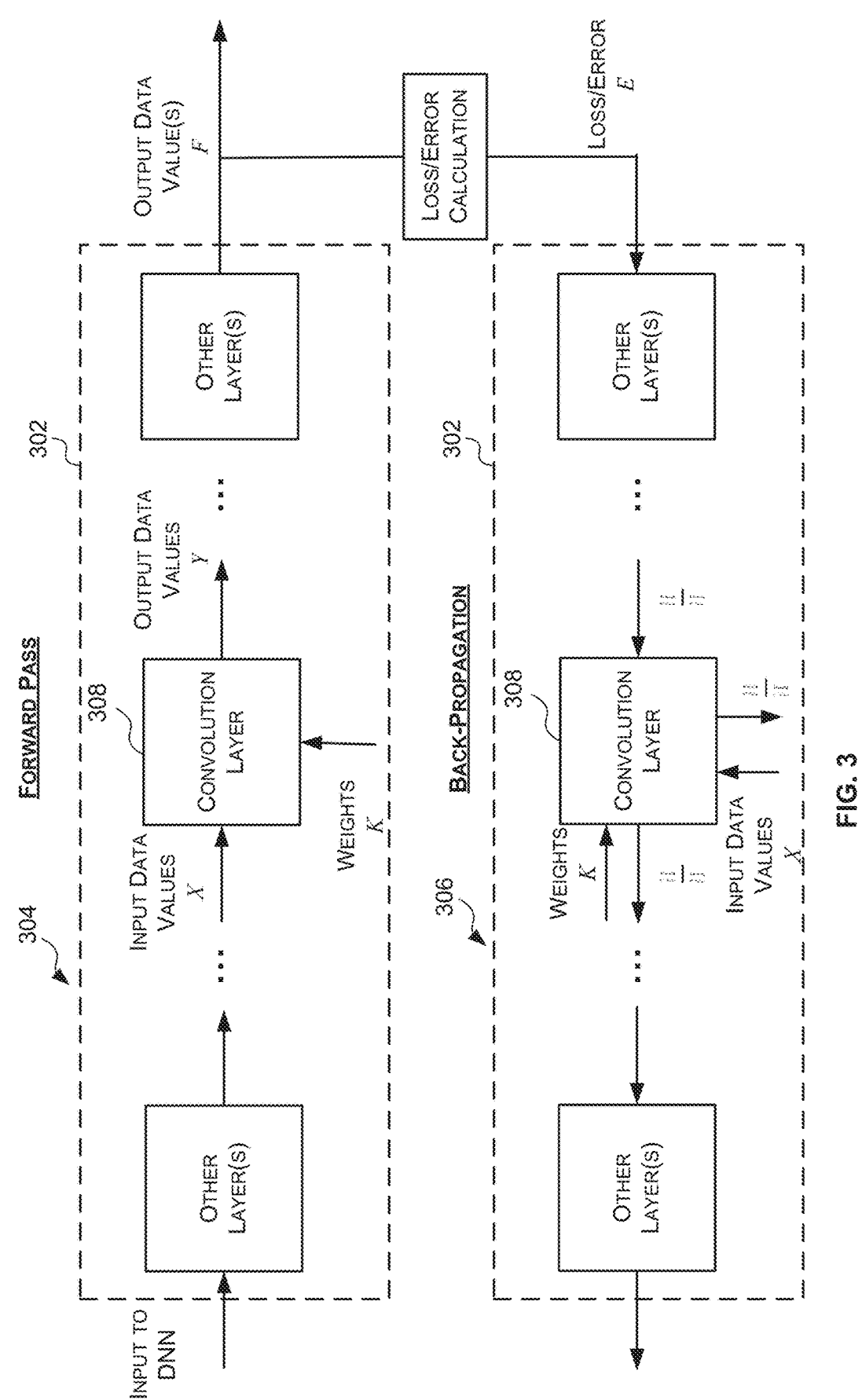
FIG. 3 is a schematic diagram illustrating training a DNN via back-propagation.

(see 306 of FIG. 3). The weights K of each layer are then adjusted based on the gradients so as to reduce the loss or error metric. Although only a single convolution layer 308 is shown in FIG. 3 it will be evident to a person of skill in the art that this is used as an example only and that the gradient or derivative of the loss or error metric E with respect to each weight of each layer may be determined. This process may be repeated until the loss or error metric E converges.

Training of a DNN via back-propagation is often performed on a general-purpose computer using a software tool, such as, but not limited to, TensorFlow®. Such software tools are often configured to determine the gradient, or derivative, of the error or loss metric with respect to the weights of each convolution layer via matrix multiplication. It may not be possible to implement this method of determining the gradients efficiently in some hardware, particularly hardware, such a DNN accelerator, designed to implement a DNN. The inventors have identified that the derivative of the error or loss metric with respect to the weights of a convolution layer can be determined efficiently in hardware via one or more group convolutions between values of the input data to the convolution layer and the gradients or derivatives of the output error or loss metric with respect to the convolution layer outputs. In particular, such group convolutions can be implemented efficiently in hardware, such as a DNN accelerator, that comprises one or more convolution engines, wherein a convolution engine is dedicated hardware that is configured to perform a convolution operation between input data and a filter.

Figure 4:
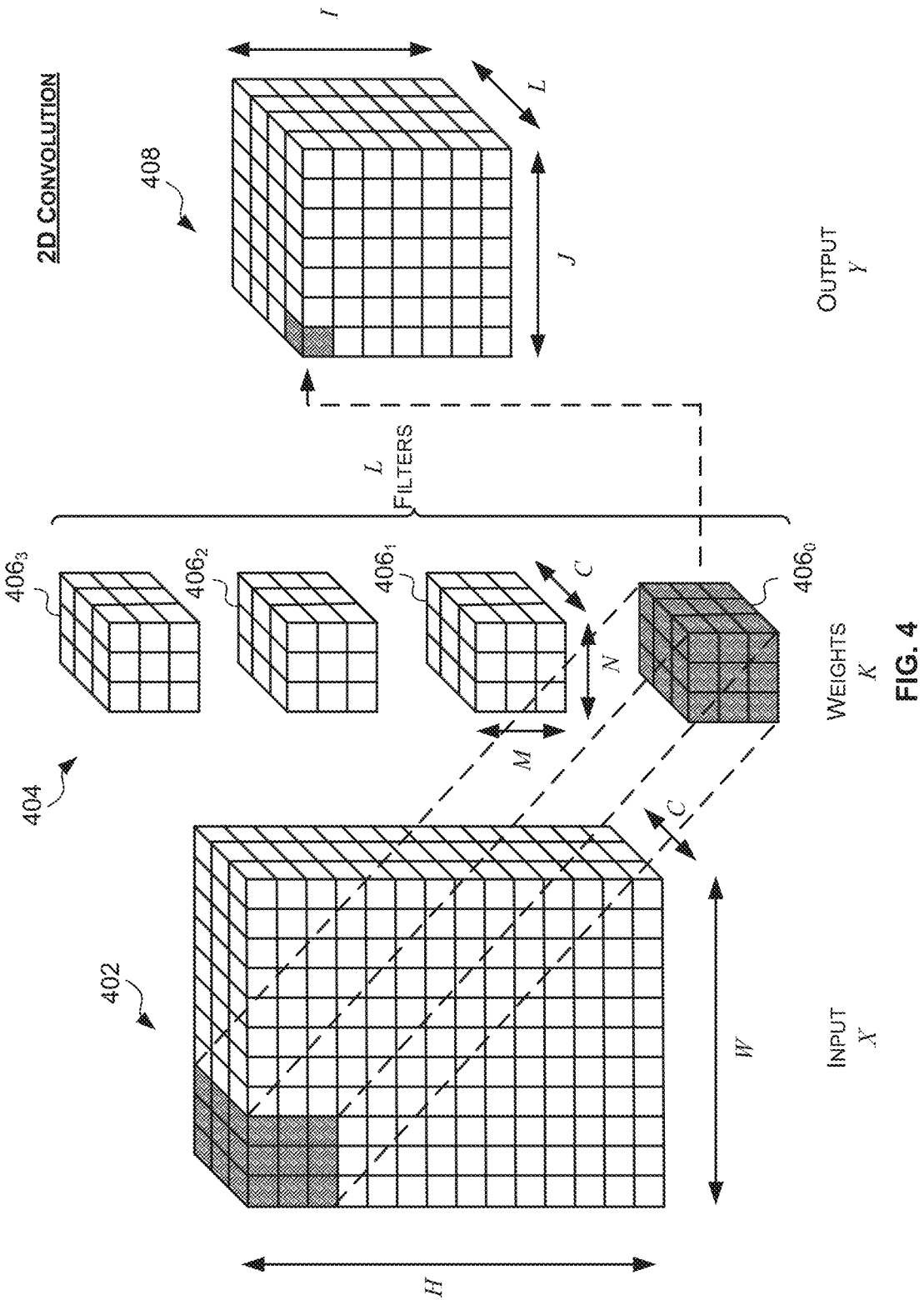
FIG. 4 is a schematic diagram illustrating an example 2D convolution.

A convolution layer of a DNN often, but not necessarily, implements a two-dimensional (2D) convolution. Reference is now made to FIG. 4 which illustrates an example 2D convolution. In the 2D convolution illustrated in FIG. 4, the input data X 402 to the layer forms a three-dimensional (3D) signal or tensor with a height H, width W, and channels C; the weights K 404 form a four-dimensional (4D) signal or tensor comprising a plurality of (e.g. L) 3D filters or kernels 406$_0$, 406$_1$, 406$_2$, 406$_3$ with a height M, width N, and channels C; and each filter 406$_0$, 406$_1$, 406$_2$, 406$_3$ is convolved with the 3D input data X 402. Each filter 406$_0$, 406$_1$, 406$_2$, 406$_3$ produces one channel, or one plane, of the output data Y 408. Therefore, if there are L filters, the output data 408 comprises L channels or planes. Accordingly, the number of filters may also be referred to as the number of output channels.

Each neuron or element of the output tensor Y (i,j,l) of a 2D convolution can be generated from the input tensor X and the weight tensor K by equation (1), wherein X(h,w,c) refers to the neuron or element of the input tensor X at the $h^{th}$ row, $w^{th}$ column and $c^{th}$ plane, Y(i,j,l) refers to the neuron or element of the output tensor Y at the $i^{th}$ row, $j^{th}$ column and the $l^{th}$ plane, K(m,n,c,l) refers to the weight at the $m^{th}$ row, $n^{th}$ column, $c^{th}$ plane of the $l^{th}$ kernel or filter, s represents the stride of the convolution, d represents the dilation, and $$p_H \text{ and } p_W$$

represent the padding in the height and width dimensions respectively.

$$Y(i, j, l) = \sum_{m=0}^{M-1} \sum_{n=0}^{N-1} \sum_{c=0}^{C-1} X(si + dm - p_H^-, sj + dn - p_W^-, c)K(m, n, c, l) \tag{1}$$

$$K \in \mathbb{R}^{M \times N \times C \times L}$$

$$Y \in \mathbb{R}^{I \times J \times L}$$

$$X \in \mathbb{R}^{H \times W \times C}$$

Accordingly, the output tensor Y is generated by sliding each filter of the weight tensor K over the input tensor X in the height dimension H and the width dimension W (in accordance with the stride(s) and dilation(s)), and generating the dot product of the input values and the weights at each position. Therefore, in a 2D convolution there are two traversed dimensions—the height dimension H and width dimension W. As is known to those of skill in the art, the stride and the dilation may be different in the height dimension H and the width dimension W. For example, the stride in the height dimension H may be 2, and the stride in the width dimension W may be 1. However, for simplicity, in the examples described herein it has been assumed that the stride is the same in the height and width dimensions, and the dilation is the same in the height and width dimensions. However, the methods and techniques described herein are not limited to convolution layers where the stride and dilation are the same in the height and width dimensions.

Figure 5:
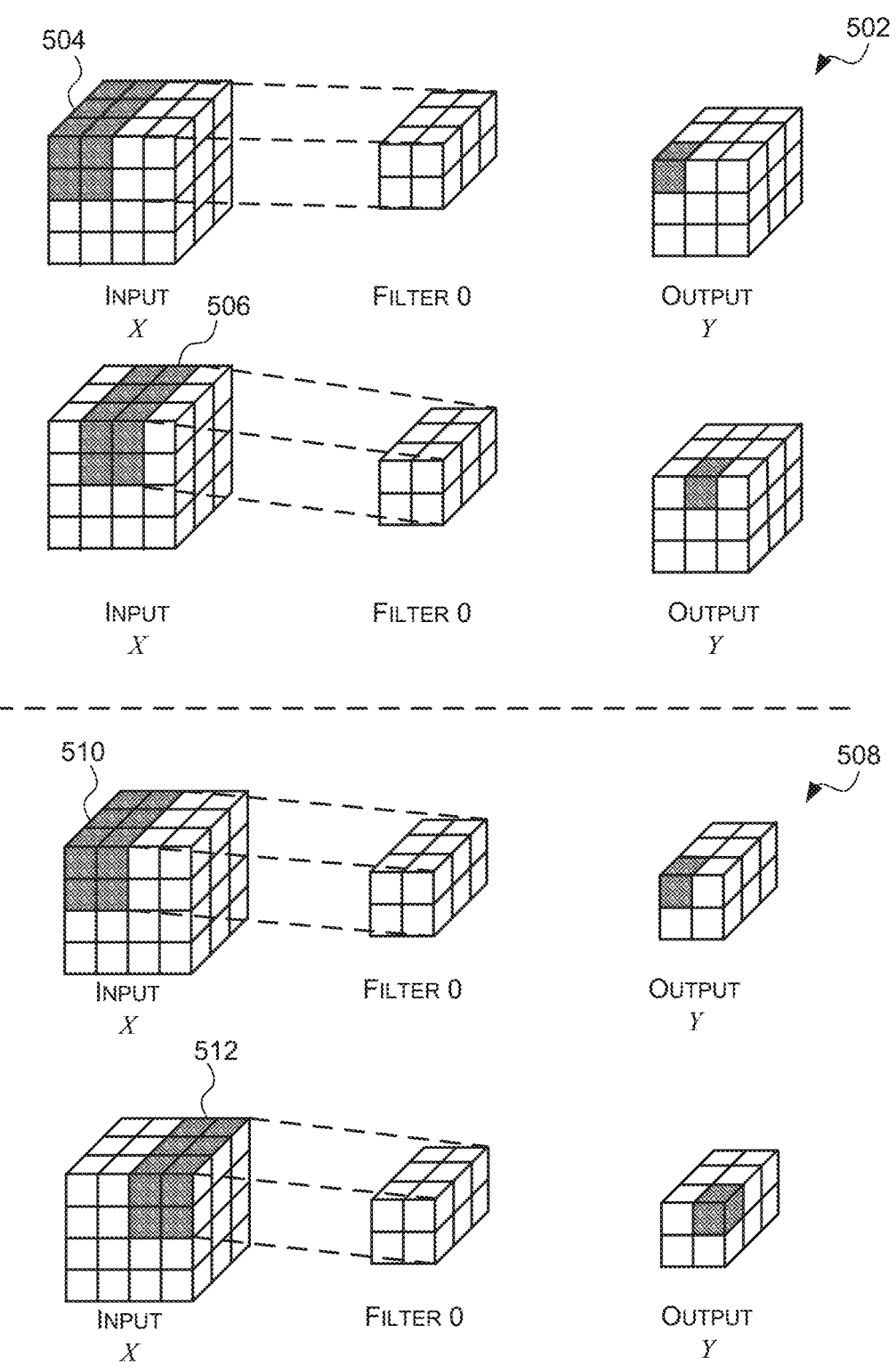
FIG. 5 is a schematic diagram illustrating the stride of a convolution.

As is known to those of skill in the art, the stride s defines the step size of the filter or kernel. Specifically, it specifies how many elements of the input data the filter shifts each time. For example, as illustrated at 502 of FIG. 5, for a stride of one, a filter of size M×N×C is first convolved with M×N×C values 504 of the input data selected from element (m,n,c) of the input data, then the filter is convolved with M×N×C values 506 of the input data selected from element (m, n+1, c). In other words, with a stride of one, the window of the input data moves one element each time. In contrast, as illustrated at 508 of FIG. 5, for a stride of two, the filter is convolved with M×N×C values 510 of the input data selected from element (m,n,c), then the filter is convolved with M×N×C values 512 of the input data starting with element (m, n+2,c). In other words, with a stride of two, the window of the input data moves two elements each time. The stride can be set to any integer greater than or equal to 1. As described above, the stride can be different in the height and width dimensions. For example, the stride can be 1 in the height dimension and 2 in the width dimension.

As is known to those of skill in the art, the dilation d, which may also be referred to as the dilation rate, describes the spacing between the positions where the values in a filter or kernel are applied. For example, as shown at 602 of FIG. 6, a 2×2×3 filter 604 with a dilation of 1 will be convolved with the twelve values in a 2×2×3 block of values 606 of the input tensor X. In contrast, as shown at 608 of FIG. 6, a 2×2×3 filter 610 with a dilation of 2 will be convolved with twelve values in a 3×3×3 block of values 612 of the input tensor X. As described above, the dilation can be different in the height and width dimensions.

As is known to those of skill in the art, by default, as shown at 702 of FIG. 7, a convolution starts with data or element (0,0,0) (i.e. the element in the top left corner) 704 of the input tensor X aligned with data or element (0,0,0) of the filter 706, and then the filter 706 is stepped across the image according to the stride s. This is referred to as a zero-padding convolution. Padding is the addition of rows and/or columns with null values to the input tensor X. For example, as shown at 708 of FIG. 7, a row of padding 710 is added to the top of a 4×4×3 input tensor X and a column of padding 712 is added to the left of the input tensor X. It can be seen that in this example the convolution starts with the element or neuron at location (0,0,0) (i.e. the element in the top left corner) 714 of the input tensor X aligned with the element or neuron at location (2,2,0) of the filter 716. The notations $p_H^-$ and $p_W^-$, are used herein to refer to the number of rows of padding that are added to the top of the input tensor X and the number of columns of padding that are added to the left of the input tensor X, respectively. The notations $$p_H^+ \text{ and } p_W^+$$

are used herein to refer to the number of rows of padding that are added to the bottom of the input tensor X and the number of columns of padding that are added to the right of the input tensor X, respectively.

If the output error or loss metric of the DNN is denoted E then the derivative of the output error or loss metric E with respect to a particular weight K (m,n,c,l) of a convolution layer can be represented using equation (2) where $$\frac{\partial E}{\partial Y(i, j, l)}$$

is the derivative or gradient of the output error or loss metric E with respect to a particular element or neuron of the convolution output tensor Y.

$$\frac{\partial E}{\partial K(m, n, c, l)} = \sum_{i=-\infty}^{+\infty} \sum_{j=-\infty}^{+\infty} \frac{\partial E}{\partial Y(i, j, l)} \frac{\partial Y(i, j, l)}{\partial K(m, n, c, l)} \tag{2}$$

Let the derivative or gradient of the output error or loss metric E with respect to a particular output element or neuron of the output tensor Y (i,j,l) of the convolution layer be represented by G (i,j,l) as shown in equation (3). Therefore G, which may be referred to herein as the output gradient tensor, is a 3D signal or tensor comprising the derivative or gradient of the output error or loss metric E with respect to each of the neurons or elements of the output tensor Y.

$$\frac{\partial E}{\partial Y(i, j, l)} = G(i, j, l) \in \mathbb{R}^{I \times J \times L} \tag{3}$$

From equation (1) the derivative or gradient of the output of the convolution layer with respect a particular weight $$\frac{\partial Y(i, j, l)}{\partial K(m, n, c, l)}$$

can be expressed as shown in equation (4).

$$\frac{\partial Y(i, j, l)}{\partial K(m, n, c, l)} = X(si + dm - p_{\overline{H}}, \; sj + dn - p_{\overline{W}}, \; c) \tag{4}$$

Using equations (3) and (4), equation (2) can then be expressed as shown in equation (5). Therefore B, which may be referred to herein as the weight gradient tensor, is a 4D signal or tensor comprising the derivative or gradient of the output error or loss metric E with respect to each weight in the weight tensor K.

$$B(m, n, c, l) \triangleq \tag{5}$$

$$\frac{\partial E}{\partial K(m, n, c, l)} = \sum_{i=0}^{I-1}\sum_{j=0}^{J-1} X(dm + si - p_{\overline{H}}, \; dn + sj - p_{\overline{W}}, \; c)G(i, j, l)$$

$$B \in \mathbb{R}^{M \times N \times C \times L}$$

$$G \in \mathbb{R}^{I \times J \times L}$$

$$X \in \mathbb{R}^{H \times W \times C}$$

The inventors have identified that the results of equation (5) can be determined efficiently in hardware as a group convolution between the values from the input tensor X and the values from the output gradient tensor G. In other words, the inventors have identified that the values of the 4D signal or tensor B (the weight gradient tensor) can be calculated efficiently in hardware, and specifically, hardware designed to implement a deep neural network (e.g. a DNN accelerator) via a group convolution between a tensor formed of values from the input tensor X and a tensor formed of values from the output gradient tensor G.

As described above with respect to FIG. 4, in a 2D convolution, each filter has the same number of channels as the input tensor X and is convolved with all of the input tensor X. In contrast, in a group convolution, the input tensor X is subdivided into multiple, g, subsets or groups on a channel basis and a different set of filters (i.e. a different set of the weights K) is convolved with each subset or group of the input tensor. Each filter has the same number of channels as its associated subset. In other words, each subset of the input tensor comprises $\lceil U/g \rceil$ channels or planes of the input, and each filter comprises $\lceil U/g \rceil$ channels or planes where U is the number of channels in the input tensor X. Like in a 2D convolution, each filter in a group convolution produces a channel or plane of the output. Accordingly, if there are R output channels or planes, each subset of the input produces $\lceil R/g \rceil$ channels or planes of the output tensor Y.

Figure 8:
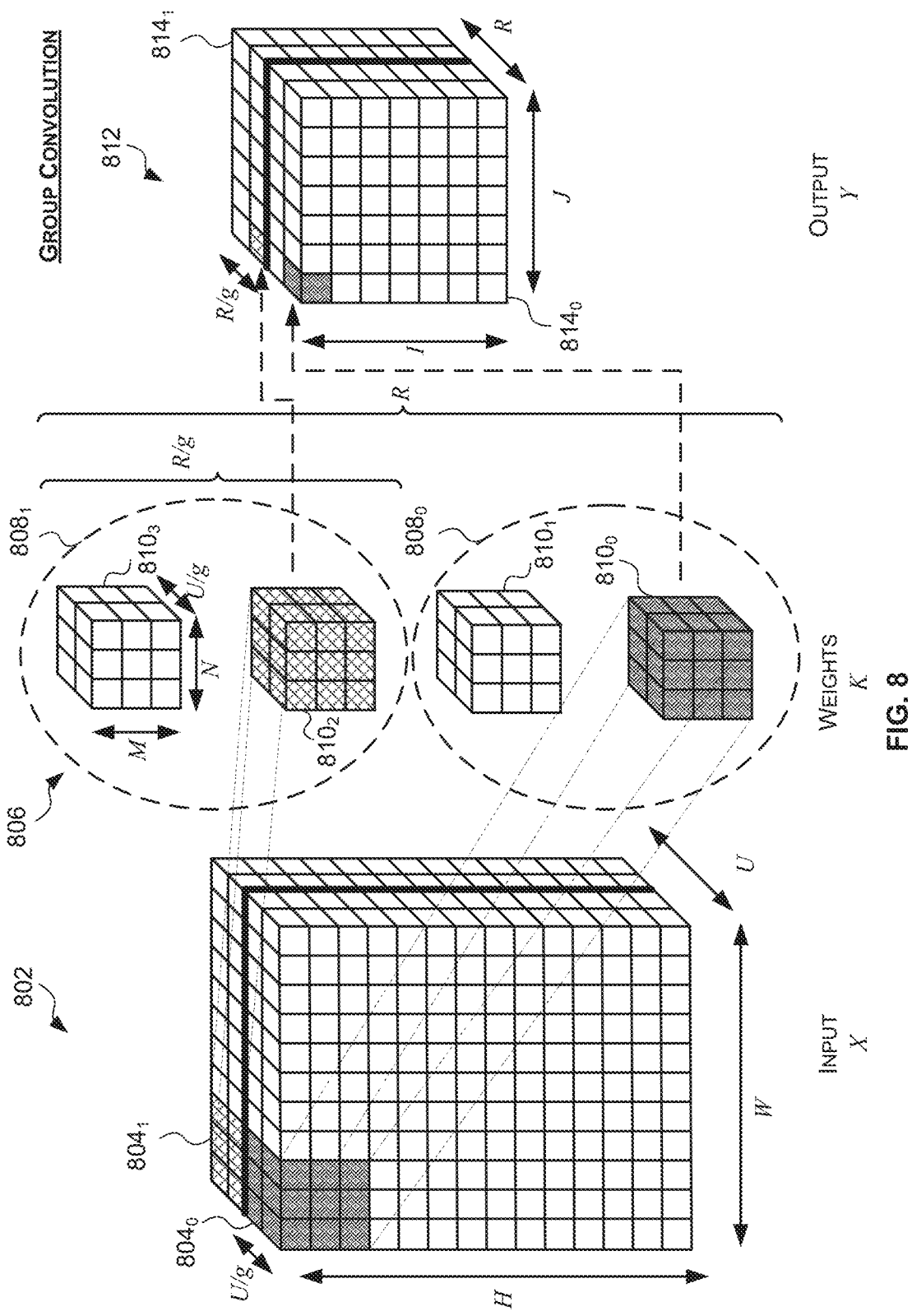
FIG. 8 is a schematic diagram illustrating an example group convolution.

An example group convolution is illustrated in FIG. 8. In this example, the input tensor X 802 has a height H, a width W, and U planes or channels, and is divided into two groups 804₀ and 804₁ (i.e. g=2). Each input group 804₀ and 804₁ comprises $$\frac{U}{g} = \frac{U}{2}$$

planes of the input tensor X. Since U=4 in this example, each input group 804₀ and 804₁ comprises two planes. The weights K 806 are divided into two filter groups 808₀, 808₁. Each filter 810₀, 810₁, 810₂, 810₃ has height M, width N and $$\frac{U}{g}$$

planes or channels. Each filter 810₀, 810₁, 810₂, 810₃ in a filter group 808₀ and 808₁ is convolved with the corresponding input group 804₀ and 804₁ to generate a channel or layer of the output tensor Y 812. For example, each filter 810₀, 810₁ in the first filter group 808₀ is convolved with the first input group 804₀ to generate a first group or subset 814₀ of the output tensor Y 812, and each filter 810₂, 810₃ in the second filter group 808₁ is convolved with the second input group 804₁ to generate a second group or subset 814₁ of the output tensor Y 812.

Each element or neuron of the output tensor Y of a group convolution can be generated in accordance with equation (6) wherein, as above, s is the stride, d is the dilation and $$p_{\overline{H}} \text{ and } p_{\overline{W}}$$

represent the padding in the height and width dimensions, respectively.

$$(6)$$

$$Y(i, j, r) =$$

$$\sum_{m=0}^{M-1}\sum_{n=0}^{N-1}\sum_{u=0}^{\lfloor \frac{U}{g} \rfloor - 1} X\left(si + dm - p_{\overline{H}}, \; sj + dn - p_{\overline{W}}, \; u + \left\lfloor \frac{rg}{R} \right\rfloor \frac{U}{g} \right) K(m, n, u, r)$$

$$K \in \mathbb{R}^{M \times N \times \frac{U}{g} \times R}$$

$$Y \in \mathbb{R}^{I \times J \times R}$$

$$X \in \mathbb{R}^{H \times W \times U}$$

The inventors have identified that the values of the four-dimensional weight gradient tensor B of equation (5) may be generated by a group convolution between the values from the input tensor X and the values from the weight gradient tensor G. Specifically, the values of the weight gradient tensor B may be generated by a group convolution between a first three-dimensional tensor comprised of values from the input tensor X (i.e. the input values of the convolution layer) and a second four-dimensional tensor comprised of values from the output gradient tensor G (i.e. the gradients of the loss or error metric with respect to the outputs of the convolution layer). Group convolutions can be implemented, or performed, efficiently in hardware, such as a DNN accelerator, that comprises one or more convolution engines, wherein a convolution engine is dedicated hardware configured to perform convolution operations. In some cases, a convolution engine may comprise a plurality of multipliers followed by an adder tree. Each multiplier is configured to multiply a first value with a second value to produce a multiplication output. The adder tree may be configured to produce the sum of the multiplication outputs.

Figure 9:
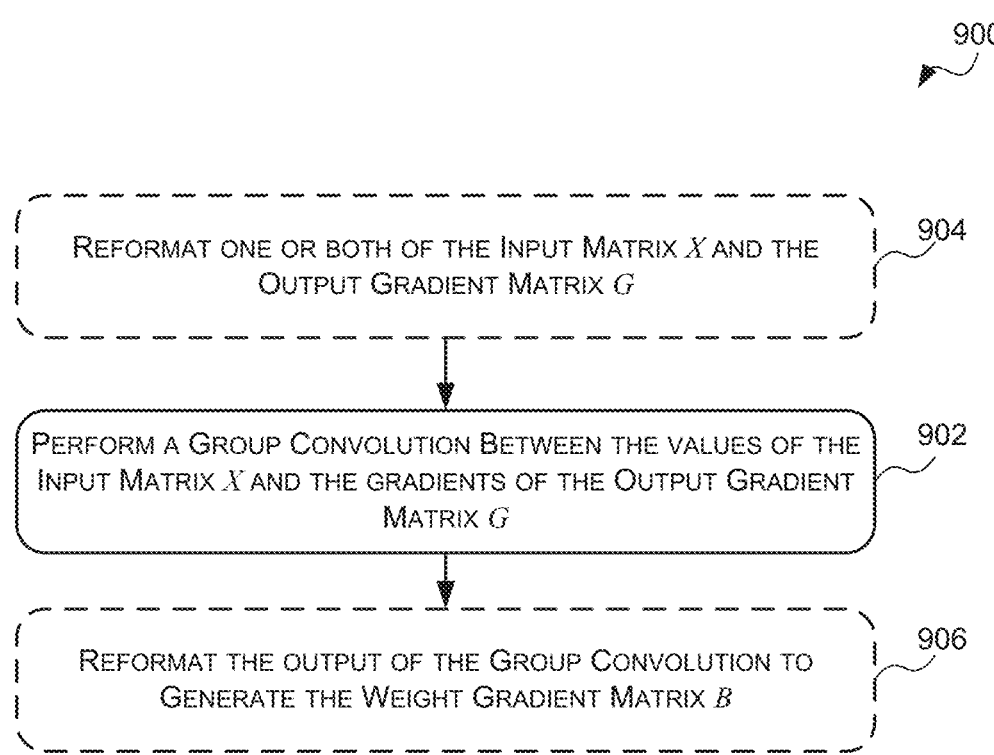
FIG. 9 is a flow diagram of an example method of generating the gradients of the loss metric for a DNN with respect to the weights of a convolution layer via a group convolution between a first three-dimensional tensor comprised of values from the input tensor and a second four-dimensional tensor comprised of values from an output gradient tensor comprising the gradients of the loss metric for the DNN with respect to the outputs of the convolution layer.

Accordingly, reference is now made to FIG. 9 which illustrates an example method 900 of generating the gradients of the output error or loss metric of a DNN with respect to the weights of a convolution layer using hardware logic. Preferably the hardware logic comprises one or more convolution engines. In some cases, the hardware logic may be a neural network accelerator, such as a DNN accelerator. An example DNN accelerator is described below with respect to FIG. 25. The method 900 comprises, at block 902, using the hardware logic to perform a group convolution between a first three-dimensional tensor comprised of values from the input tensor X (i.e. the input values of the convolution layer) and a second four-dimensional tensor comprised of values from the output gradient tensor G (i.e. the gradients of the loss or error metric with respect to the output values of the convolution layer).

It can be seen from equation (5) that the values of the weight gradient tensor B are generated by convolving each channel of the input tensor X with each channel of the output gradient tensor G with a stride of d and a dilation of s, wherein s is the stride for the convolution layer and d is the dilation for the convolution layer. Specifically, if the input tensor X comprises three channels and the output gradient tensor G has four channels, then the values of the weight gradient tensor B are generated by convolving the first channel of the input tensor X with the first channel of the output gradient tensor G, convolving the first channel of the input tensor X with the second channel of the output gradient tensor G, convolving the first channel of the input tensor X with the third channel of the output gradient tensor G, convolving the first channel of the input tensor X with the fourth channel of the output gradient tensor G, convolving the second channel of the input tensor X with the first channel of the output gradient tensor G, convolving the second channel of the input tensor X with the second channel of the output gradient tensor G etc.

Accordingly, the first three-dimensional tensor, the second four-dimensional tensor and the group convolution are configured so as to generate the output of a convolution operation between each channel of the input tensor X and each channel of the output gradient tensor G. Example group convolutions of this form are described below.

Where the hardware logic comprises one or more convolution engines the group convolution may be performed by, or implemented by, the one or more convolution engines.

Depending on the specific group convolution performed and how the values of the input tensor X and gradients of the output gradient tensor G are received, the method 900 may further comprise at block 904, reformatting the input tensor X to generate the first three-dimensional tensor and/or reformatting the output gradient tensor G to generate the second four-dimensional tensor. Example methods for reformatting the input tensor X and/or the output gradient tensor G to generate the first three-dimensional tensor and the second four-dimensional tensor respectively are described below.

Similarly, in some cases, depending on the particular group convolution that is performed, the method 900 may further comprise at block 906, reformatting the output of group convolution to generate the weight gradient tensor B. Example methods of reformatting the output of the group convolution are described below.

First Example Group Convolution to Generate the Weight Gradient Tensor B

Figure 10:
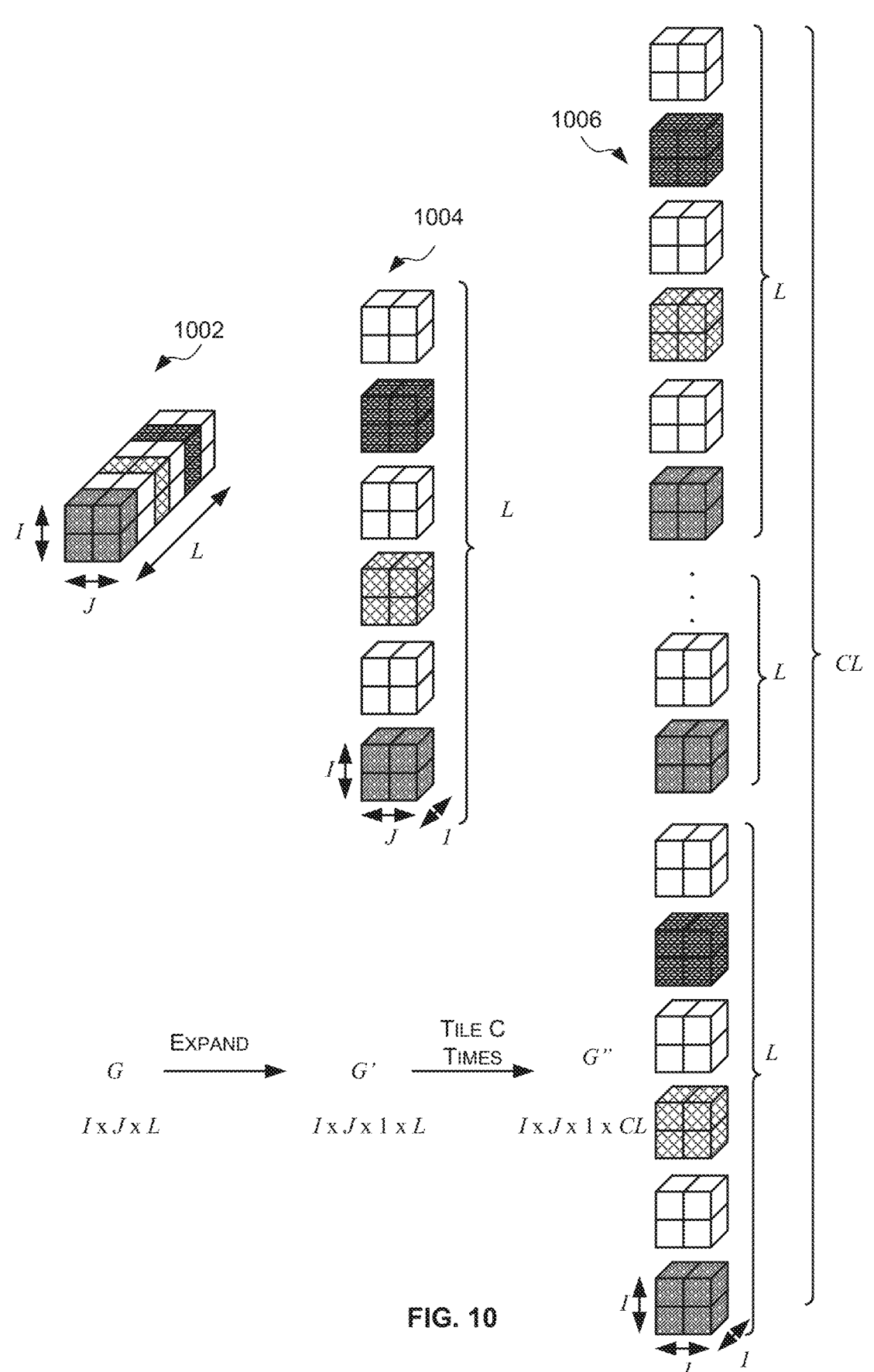
FIG. 10 is a schematic diagram illustrating a first example method of generating the second four-dimensional tensor for the group convolution from the output gradient tensor.
Figure 11:
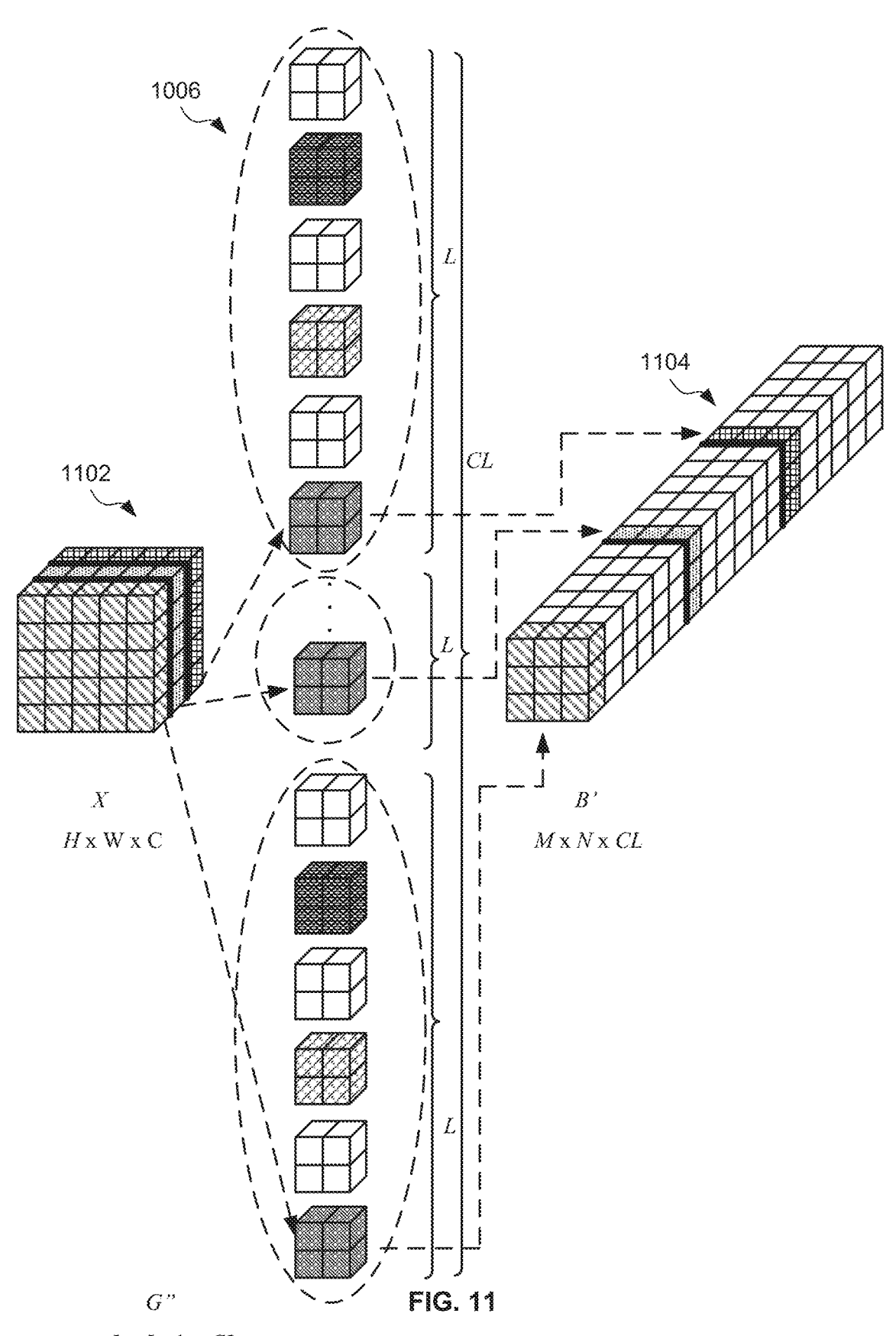
FIG. 11 is a schematic diagram illustrating an example group convolution between the input tensor of a convolution layer and the second four-dimensional tensor of FIG. 10.
Figure 12:
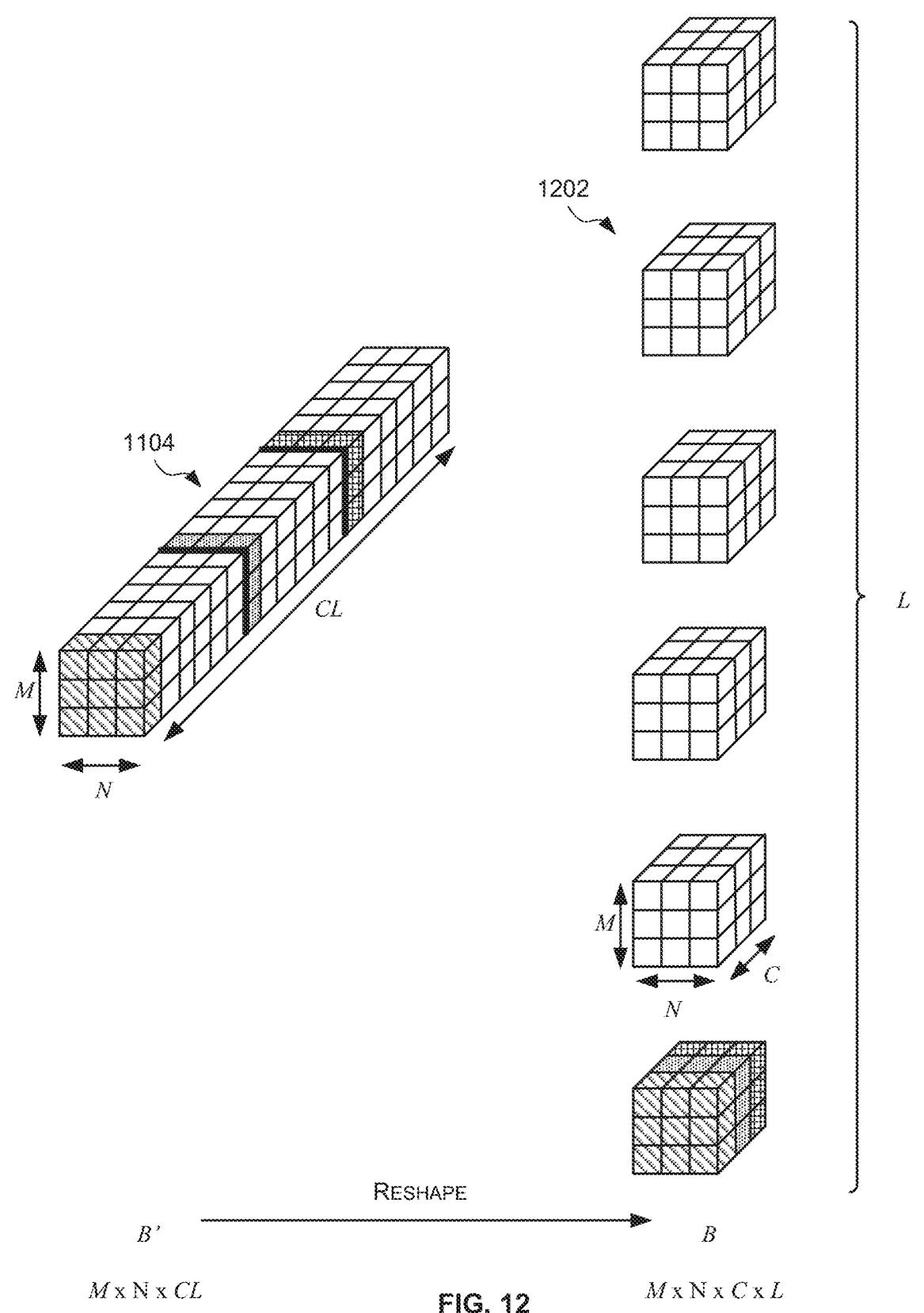
FIG. 12 is a schematic diagram illustrating a first example method of reformatting the output of the group convolution of FIG. 11 to generate a weight gradient tensor comprising the gradients of the loss metric for the DNN with respect to the weights of the convolution layer.

Reference is now made to FIGS. 10 to 12 which illustrate a first example group convolution between a first three-dimensional tensor comprised of values from the input tensor X (i.e. the input values of the convolution layer) and a second four-dimensional tensor comprised of values from the output gradient tensor G (i.e. the gradients of the error or loss metric E with respect to the outputs Y of the convolution layer) which generates the values of the weight gradient tensor B of equation (5) (i.e. the gradients of the error or loss metric E with respect to the weights K of the convolution layer). In this first example group convolution there are C groups (i.e. g=C) and there are C*L filters, where C is the number of channels in the input tensor X of the convolution layer, and L is the number of channels in the output tensor Y of the convolution layer (which can alternatively be described as the number of filters in the weight tensor K of the convolution layer).

In this example, the first three-dimensional tensor comprised of values from the input tensor X is equal to the input tensor X. As described above, the values of the weight gradient tensor B of equation (5) are generated by convolving each channel of the input tensor X with each channel of the output gradient tensor G with a stride of d and a dilation of s, wherein s is the stride for the convolution layer and d is the dilation for the convolution layer. Therefore, the gradients of the weight gradient tensor B can be generated by a group convolution between the input tensor X and a four-dimensional tensor that comprises C groups of filters, and each group of filters comprises L filters, one filter for each of the L channels of the output gradient tensor G.

An example of such a four-dimensional tensor is one that comprises C*L filters wherein the $a^{th}$ filter corresponds to the $b^{th}$ channel of the output gradient tensor G, wherein a is any integer in the set 0 to (C*L)−1, C is the number of channels of the input tensor, and b is equal to a modulo L. In other words, a four-dimensional tensor comprising C*L filters wherein every $L^{th}$ filter is the same and corresponds to one of the channels of the output gradient tensor G.

For example, FIG. 10 illustrates an example output gradient tensor G 1002 with a height I of 2, a width J of 2 and 6 channels (i.e. L=6). An example four-dimensional tensor G" 1006 that can be convolved, via a group convolution, with an input tensor X with 3 channels (i.e. C=3) to generate the values of the weight gradient tensor B comprises 18 (C*L=3*6) filters, the 18 filters can be divided into 3 (i.e. C) groups wherein each group comprises a 2×2×1 (i.e. I×J×1) filter that is equivalent to a channel of the output gradient tensor G 1002. Specifically, in this example, the first filter in each group is equivalent to the first channel of the output gradient tensor G 1002, the second filter in each group is equivalent to the second channel of the output gradient tensor G 1002, the third filter in each group is equivalent to the third channel of the output gradient tensor G 1002 and so on.

Since there are C groups of filters in the four-dimensional tensor G" 1006, each group of filters is convolved with one channel of the input tensor X 1102. Since each group of filters in the four-dimensional tensor G" 1006 comprises a filter that corresponds to each of the channels of the output gradient tensor G, such a group convolution produces the output of a convolution operation between each channel of the input tensor X 1102 and each channel of the output gradient tensor G 1002.

It will be shown mathematically that such a group convolution will generate the values of the weight gradient tensor B of equation (5). Specifically, equation (5) can be re-written with G" 1006 as shown in equation (7).

$$(7)$$

$$B(m, n, c, l) =$$

$$\sum_{i=0}^{I-1}\sum_{j=0}^{J-1} X(dm + si - p_H^-,\ dn + sj - p_W^-,\ c)G''(i, j, 0, cL + l)$$

This is not a group convolution as the output is a four-dimensional tensor or signal, rather than a three-dimensional tensor or signal. If the third and fourth dimensions of the weight gradient tensor B are combined, equation (7) can be re-written to generate a three-dimensional output as shown in equation (8).

$$B'(m, n, cL + l) = \sum_{i=0}^{I-1}\sum_{j=0}^{J-1} X(dm + si - p_H^-, dn + sj - p_W^-, c)G''(i, j, 0, cL + l) \tag{8}$$

If r=cL+l then equation (8) can be re-written as equation (9).

$$B'(m, n, r) = \sum_{i=0}^{I-1}\sum_{j=0}^{J-1} X\left(dm + si - p_H^-, dn + sj - p_W^-, \frac{r-l}{L}\right)G''(i, j, 0, r) \tag{9}$$

Since $$\frac{r - l}{L}$$

is an integer because it is substituted for c which is an integer, equation (9) can be re-written as equation (10).

$$B'(m, n, r) = \sum_{i=0}^{I-1}\sum_{j=0}^{J-1} X\left(dm + si - p_H^-, dn + sj - p_W^-, \left\lfloor\frac{r}{L}\right\rfloor\right)G''(i, j, 0, r) \tag{10}$$

If the number of groups g in a group convolution is equal to the number of input channels U, the number of input channels U is equal to C, and the number of filters R in the group convolution is C*L then the group convolution of equation (6) can be re-written as equation (11). This can then be simplified to equation (12), and then to equation (13).

$$Y(i, j, r) = \sum_{m=0}^{M-1}\sum_{n=0}^{N-1}\sum_{u=0}^{\lfloor\frac{C}{C}\rfloor-1} X\left(si + dm - p_H^-, sj + dn - p_W^-, u + \left\lfloor\frac{rC}{CL}\right\rfloor\left\lfloor\frac{C}{C}\right\rfloor\right)K(m, n, u, r) \tag{11}$$

$$Y(i, j, r) = \sum_{m=0}^{M-1}\sum_{n=0}^{N-1}\sum_{u=0}^{0} X\left(si + dm - p_H^-, sj + dn - p_W^-, 0 + \left\lfloor\frac{r}{L}\right\rfloor\right)K(m, n, 0, r) \tag{12}$$

$$Y(i, j, r) = \sum_{m=0}^{M-1}\sum_{n=0}^{N-1} X\left(si + dm - p_H^-, sj + dn - p_W^-, \left\lfloor\frac{r}{L}\right\rfloor\right)K(m, n, 0, r) \tag{13}$$

It can be seen that equations (10) and (13) are equivalent if Y in equation (13) is replaced with B', and K in equation (13) is replaced with G". Accordingly, equation (10) is a group convolution between X and G" that produces the values of the weight gradient tensor B.

In this example, tensor G" 1006 is the second four-dimensional tensor. Therefore block 904 of method 900 may comprise generating the second four-dimensional tensor G" 1006 from the output gradient tensor G 1002. As shown in FIG. 10, the four-dimensional tensor G" 1006 may be generated from the output gradient tensor G 1002 by expanding the three-dimensional output gradient tensor G 1002 to a four-dimensional tensor G' (I×J×1×L) 1004 with L three-dimensional tensors (which may be referred to as filters), wherein each 3D tensor/filter thereof is equal to a channel of the output gradient tensor G (I×J×L); and then tiling the expanded tensor G' (I×J×1×L) 1004 C times to generate the tensor G" (I×J×1×CL) 1006. The term expanding a tensor is used herein to mean adding an axis of size 1 before the last axis. For example, as shown in FIG. 10 expanding the output gradient tensor G 1002 with dimensions (I×J×L) results in a four-dimensional tensor G' 1004 with dimensions (I×J×1×L). The term tiling a tensor e times along v means copying the tensor e times along the v axis or dimension. For example, the four-dimensional tensor G' is copied C times along the fourth axis to generate a four-dimensional tensor G" with dimensions (I×J×1×CL). As can be seen in FIG. 10, G" comprises C*L 3D tensors/filters wherein every $L^{th}$ 3D tensor/filter is the same and corresponds to one of the channels of the output gradient tensor G. It will be evident to a person of skill in the art that this is one example method of generating the four-dimensional tensor G" 1006 from the output gradient tensor G 1002, and that the four-dimensional tensor G" 1006 may be generated from the output gradient tensor G 1002 in another manner. For example, the four-dimensional tensor G" may alternatively be generated from the output gradient tensor G 1002 by first tiling the output gradient tensor G, C times in the channel dimension, and then expanding the tiled tensor.

FIG. 11 illustrates the group convolution between the four-dimensional tensor G" 1006 and the input tensor X 1102 where the number of groups is C. It can be seen that this group convolution results in a three-dimensional tensor B' 1104 (equation (9)). While, as shown above, tensor B' 1104 comprises all of the values of the weight gradient tensor B, tensor B' is three-dimensional, and the weight gradient tensor B is four-dimensional. Accordingly, in this example, block 906 of the method 900 may comprise reformatting the output of the group convolution (i.e. tensor B') so as to generate the weight gradient tensor B. This can be alternatively described as reversing the steps to generate equation (10) from equation (7).

Reference is now made to FIG. 12 which illustrates an example method of generating the weight gradient tensor B 1202 from the output of the group convolution of FIG. 11 (i.e. three-dimensional tensor B' 1104). In this example method, the weight gradient tensor B 1202 is generated from the group convolution output (i.e. three-dimensional tensor B' 1104) by reshaping the three-dimensional tensor B'. The term reshaping a tensor comprises converting a tensor of o dimensions into a reshaped tensor of o+1 dimensions by splitting a dimension of the tensor. For example, a tensor of dimensions (M×N×CL) may be reshaped to a tensor of dimensions (M×N×C×L).

It will be evident to a person of skill in the art that the four-dimensional tensor G" 1006 of FIG. 10 is just an example of a four-dimensional tensor that can be used to generate the gradients of the weight gradient tensor B via group convolution with the input tensor X wherein the group convolution has C groups, and other four-dimensional tensors generated from the output gradient tensor G can be used to generate the weight gradient tensor B via a group convolution with the input tensor X. Specifically, so long as each group of filters in the four-dimensional tensor comprises a filter that corresponds to each channel of the output gradient tensor G, then the filters within in each group may be in any order within a group. For example, each group will comprise one channel of the output gradient tensor G, however the channels within a group do not have to be in the same order as they are in the output gradient tensor G, and/or each group does not need to have the channels in the same order. For example, a first group may have channel 0 of the output gradient tensor G as the first filter, and a second group may have channel 0 of the output gradient tensor G as the second filter etc.

Similarly, it will be evident to a person of skill in the art that the input tensor X is simply an example of a three-dimensional tensor that can be used to generate the values of the weight gradient tensor via group convolution with a four-dimensional tensor, such as, but not limited to, tensor G", where there are C groups. For example, the three-dimensional tensor may be any three-dimensional tensor that comprises C channels wherein each channel of the three-dimensional tensor corresponds to a channel of the input tensor X. In other words, the channels of the input tensor X may be in any order (i.e. they do not have to be in the same order that they are in the input tensor X) so long as the channels of the output of the group convolution can be mapped to the channels of the weight gradient tensor B.

Second Example Group Convolution to Generate Weight Gradient Tensor B

Reference is now made to FIGS. 13 to 16 which illustrate a second example group convolution between a first three-dimensional tensor comprised of values from the input tensor X (i.e. the input values of the convolution layer) and a second four-dimensional tensor comprised of values from the output gradient tensor G (i.e. the gradients of the error or loss metric E with respect to the outputs Y of the convolution layer) which generates the gradients of the weight gradient tensor B of equation (5) (i.e. the gradients of the error or loss metric E with respect to the weights K of the convolution layer). In this second example group convolution there are C*L groups (i.e. g=C*L) and there are C*L filters, where C is the number of channels in the input tensor X of the convolution layer, and L is the number of channels in the output tensor Y of the convolution layer (which can alternatively be described as the number of filters in the weight tensor K of the convolution layer).

Figure 13:
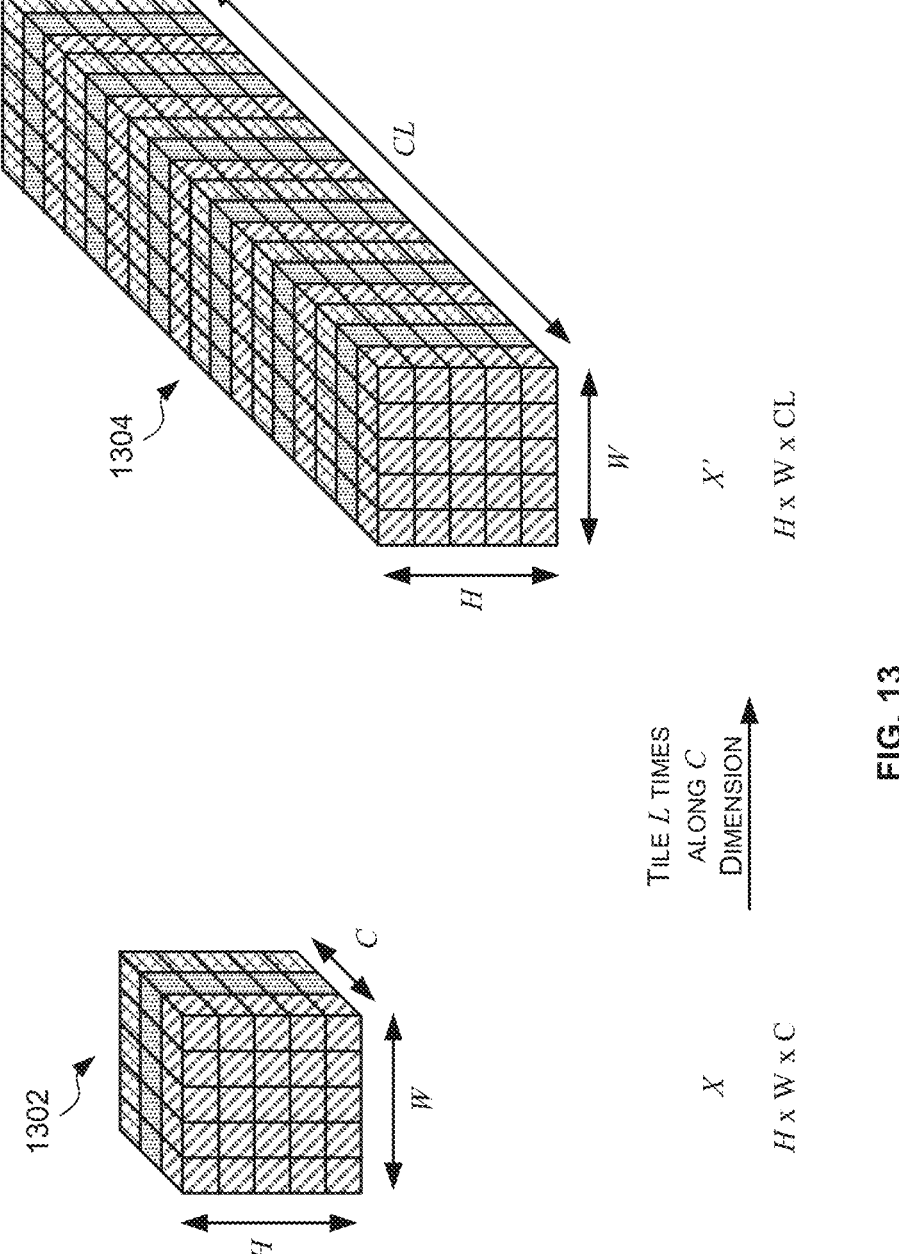
FIG. 13 is a schematic diagram illustrating a first example method of generating the first three-dimensional tensor for the group convolution from the input tensor.

In this example, the first three-dimensional tensor comprised of values from the input tensor X comprises L copies of each channel of the input tensor X. An example of such a three-dimensional tensor is one which comprises L copies of the input tensor in the channel dimension. For example, FIG. 13 illustrates an example input tensor X 1302 with a height H of 5, a width W of 5, and 3 channels (i.e. C=3). An example three-dimensional tensor X' 1304 that can be convolved with a four-dimensional tensor of output gradients to generate the values of the weight gradient tensor B, via a group convolution with C*L groups, comprises L copies of the input tensor X 1302 along the channel axis, wherein L=6 in this example. Specifically, in this example, the three-dimensional tensor X' 1304 comprises C*L channels and the $q^{th}$ channel of the three-dimensional tensor X' 1304 comprises the $r^{th}$ channel of the input tensor X 1302, wherein q is any integer in the set 0 to (C*L)−1, C is a number of channels in the input tensor X 1302, L is a number of filters in the convolution layer, and r is q modulo L.

As described above, the values of the weight gradient tensor B of equation (5) are generated by convolving each channel of the input tensor X with each channel of the output gradient tensor G with a stride of d and a dilation of s, wherein s is the stride for the convolution layer and d is the dilation for the convolution layer. Therefore, the gradients of the weight gradient tensor B can be generated by a group convolution between the three-dimensional tensor X' 1304 and a four-dimensional tensor that G" that comprises C copies of each channel of the output gradient tensor G, the copies being arranged so that each channel of the output gradient tensor G is convolved with each channel of the input tensor X.

An example of such a four-dimensional tensor G", which can be convolved with the three-dimensional tensor X' of FIG. 13, is one that comprises C*L filters and the $t^{th}$ filter comprises the $u^{th}$ channel of the output gradient tensor G, wherein t is any integer in the set 0 to (C*L)−1, C is the number of channels of the input tensor X 1302, and u is equal to $$\left\lfloor \frac{t}{C} \right\rfloor.$$

In other words, a four-dimensional tensor comprising C*L filters wherein each set of C filters in row are the same and correspond to one of the channels of the output gradient tensor G.

Figure 14:
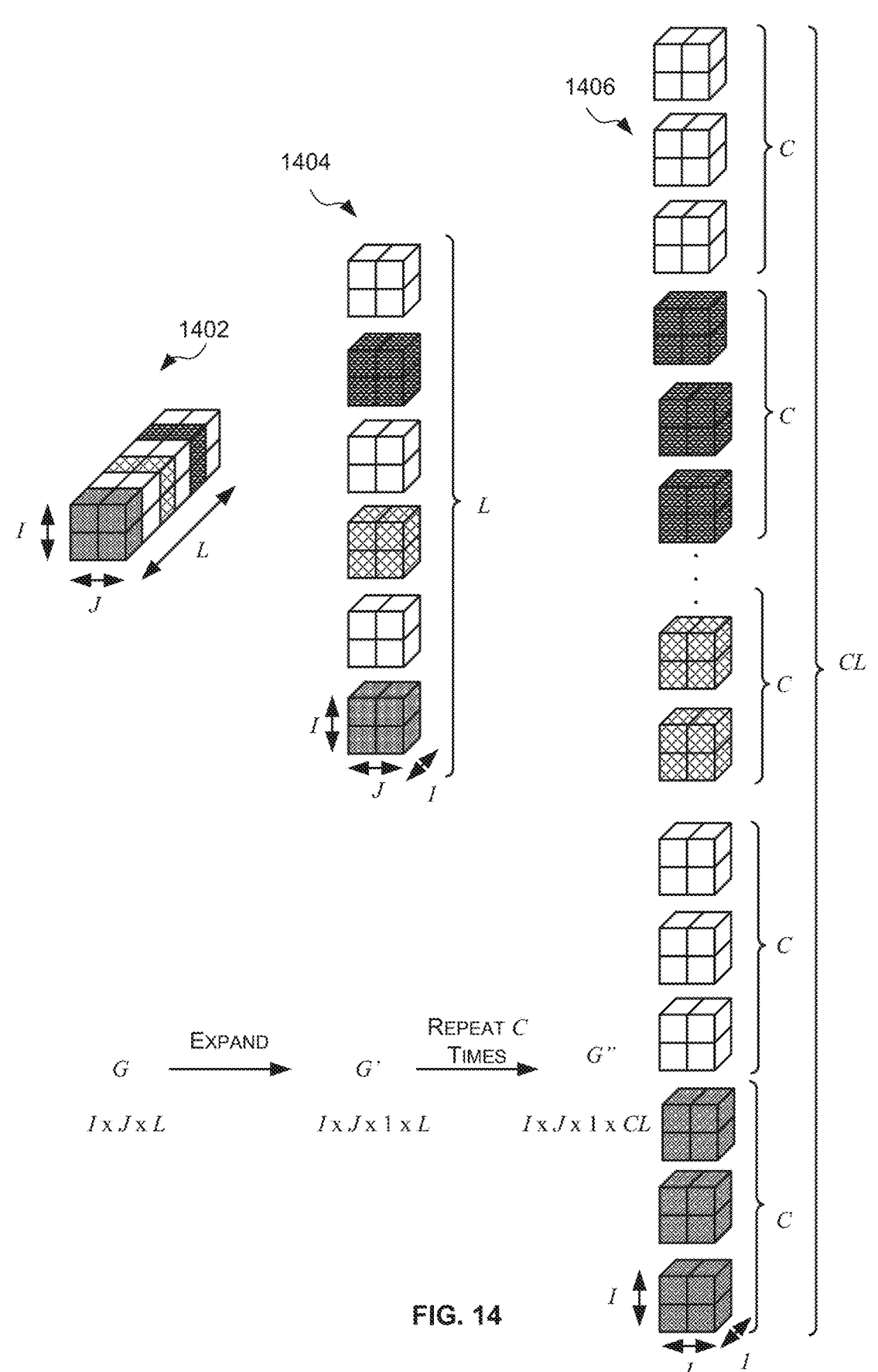
FIG. 14 is a schematic diagram illustrating a second example method of generating the second four-dimensional tensor for the group convolution from the output gradient tensor.

For example, FIG. 14 illustrates an example output gradient tensor G 1402 with a height I of 2, a width J of 2, and 6 channels (i.e. L=6). An example four-dimensional tensor G" 1406 that can be convolved, via a group convolution, with the three-dimensional tensor X' 1304 of FIG. 13 to generate the gradients of the weight gradient tensor B comprises 18 (C*L=3*6) filters, wherein each set of C consecutive filters are the same and are equivalent to one channel of the output gradient tensor G 1402. Specifically, the first three filters in the four-dimensional tensor G" 1406 are the same and are equivalent to the first channel of the output gradient tensor G 1402, the next three filters in the four-dimensional tensor G" 1406 are the same and are equivalent to the second channel of the output gradient tensor G 1402, the next three filters in the four-dimensional tensor G" 1406 are the same and are equivalent to the third channel of the output gradient tensor G 1402 and so on.

Since the filters in the tensor G" 1406 are divided into C*L groups and the three-dimensional tensor X' 1304 comprises C*L channels, each filter group is convolved with one channel of the three-dimensional tensor X' 1304. It can be seen that the channels of the three-dimensional tensor X' 1304 and four-dimensional tensor G" 1406 have been arranged such that a group convolution between the two tensors produces the output of a convolution operation between each channel of the input tensor X 1302 and each channel of the output gradient tensor G 1402.

It will be shown mathematically that such a group convolution will generate the values of the weight gradient tensor B of equation (5). Specifically, equation (5) can be re-written with X' 1304 and G" 1406 as shown in equation (14).

$$B(m, n, c, l) = \qquad\qquad (14)$$

$$\sum_{i=0}^{I-1}\sum_{j=0}^{J-1} X'(dm + si - p_H^-, dn + sj - p_W^-, c + lC)G''(i, j, 0, c + lC)$$

This is not a group convolution as the output is a four-dimensional tensor or signal, rather than a three-dimensional tensor or signal. If the third and fourth dimensions of the weight gradient tensor B are combined, equation (14) can be re-written to generate a three-dimensional output as shown in equation (15).

$$B'(m, n, c + lC) =$$
$$\sum_{i=0}^{I-1}\sum_{j=0}^{J-1} X'(dm + si - p_H^-, dn + sj - p_W^-, c + lC)G''(i, j, 0, c + lC) \tag{15}$$

If r=c+lC then equation (15) can be re-written as equation (16).

$$B'(m, n, r) = \sum_{i=0}^{I-1}\sum_{j=0}^{J-1} X'(dm + si - p_H^-, dn + sj - p_W^-, r)G''(i, j, 0, r) \tag{16}$$

If the number of groups g in a group convolution is equal to the number of input channels U, the number of input channels U is equal to C*L, and the number of filters R in the group convolution is C*L then the group convolution of equation (6) can be re-written as equation (17). This can then be simplified to equation (18), and then to equation (19).

$$Y(i, j, r) =$$
$$\sum_{m=0}^{M-1}\sum_{n=0}^{N-1}\sum_{u=0}^{\left\lfloor\frac{CL}{CL}\right\rfloor-1} X\left(si + dm - p_H^-, sj + - p_W^-, u + \left\lfloor\frac{rCL}{CL}\right\rfloor\left\lfloor\frac{CL}{CL}\right\rfloor\right)K(m, n, u, r) \tag{17}$$

$$Y(i, j, r) =$$
$$\sum_{m=0}^{M-1}\sum_{n=0}^{N-1}\sum_{u=0}^{0} X\left(si + dm - p_H^-, sj + dn - p_W^-, 0 + \left\lfloor\frac{r}{1}\right\rfloor\right)K(m, n, 0, r) \tag{18}$$

$$Y(i, j, r) = \sum_{m=0}^{M-1}\sum_{n=0}^{N-1} X(si + dm - p_H^-, sj + dn - p_W^-, r)K(m, n, 0, r) \tag{19}$$

It can be seen that equations (16) and (19) are equivalent if Y in equation (19) is replaced with B', X in equation (19) is replaced with X', and K in equation (19) is replaced with G''. Accordingly, equation (16) is a group convolution between X' and G'' that generates the gradients of the weight gradient tensor B.

In this example, tensor X' 1304 is the first three-dimensional tensor of the group convolution. Therefore, block 904 of method 900 may comprise generating the first three-dimensional tensor X' from the input tensor X 1302. As shown in FIG. 13, the three-dimensional tensor X' 1304 may be generated from the input tensor X 1302 by tiling the input tensor X L times along the channel, C, dimension. As described above, the term tiling a tensor e times along v means copying the tensor e times along the v axis. For example, as shown in FIG. 13, the input tensor X 1302 is copied L times along the channel axis or dimension to generate a three-dimensional tensor X' 1304 with dimensions (I×J×CL). As can be seen in FIG. 13, X' comprises C*L channels wherein every $L^{th}$ channel is the same and corresponds to one of the channels of the input tensor X. It will be evident to a person of skill in the art that this is one example method of generating the three-dimensional tensor X' 1304 from the input tensor X 1302, and that the three-dimensional tensor X' 1304 may be generated from the input tensor X 1302 in another manner.

In this example, tensor G'' 1406 is the second four-dimensional tensor of the group convolution. Therefore, block 904 of method 900 may comprise generating the second four-dimensional tensor G'' from the output gradient tensor G. As shown in FIG. 14, the four-dimensional tensor G'' 1406 may be generated from the output gradient tensor G by expanding the three-dimensional output gradient tensor G 1402 to a four-dimensional tensor G' (I×J×1×L) 1404 with L three-dimensional tensors (which may be referred to as filters), wherein each 3D tensor/filter thereof is equal to a channel of the output gradient tensor G (I×J×L) 1402; and then repeating each filter of the expanded tensor G' 1404 C times in the fourth dimension to generate the tensor G'' (I×J×1×CL) 1406. As described above, the term expanding a tensor is used herein to mean adding an axis of size 1 before the last axis. For example, as shown in FIG. 14, expanding the output gradient tensor G 1402 with dimensions (I×J×L) results in a four-dimensional tensor G' 1404 with dimensions (I×J×1×L). The term repeating a tensor a times along an axis or dimension k means repeating each entry on dimension k, a times. For example, each 3D filter is repeated C times in a row to generate a four-dimensional tensor G'' 1406 with dimensions (I×J×1×CL). As can be seen in FIG. 14, G'' comprises C*L 3D tensors/filters wherein each set of C filters in a row are the same and correspond to one of the channels of the output gradient tensor G. It will be evident to a person of skill in the art that this is one example method of generating the four-dimensional tensor G'' 1406 from the output gradient tensor G 1402, and that the four-dimensional tensor G'' 1406 may be generated from the output gradient tensor G 1402 in another manner. For example, the four-dimensional tensor G'' may be alternatively generated from the output gradient tensor G by first repeating the channels of G, C times, and then expanding the repeated tensor.

Figure 15:
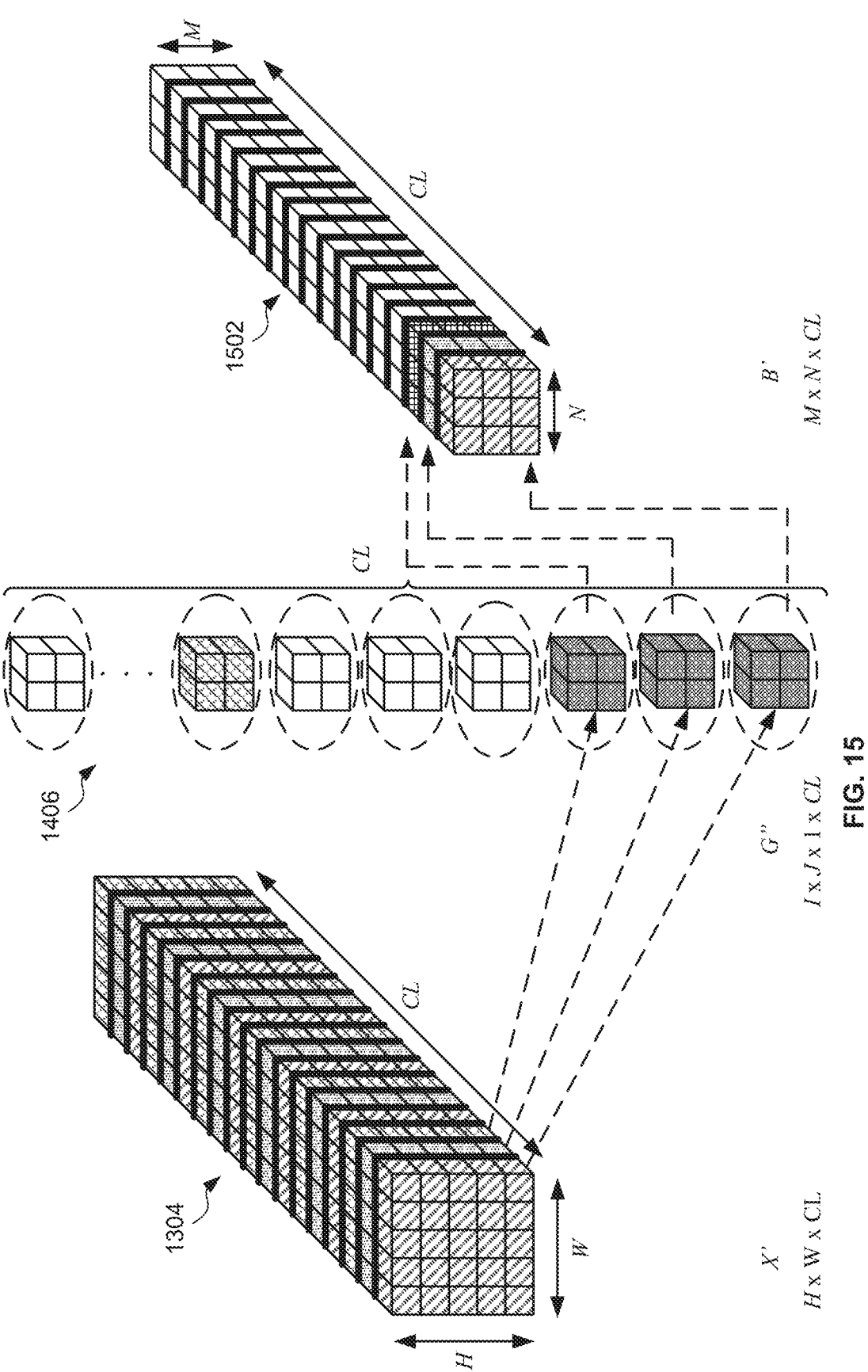
FIG. 15 is a schematic diagram illustrating an example group convolution between the first three-dimensional tensor of FIG. 13 and the second four-dimensional tensor of FIG. 14.

FIG. 15 illustrates the group convolution between the three-dimensional tensor X' 1304 and the four-dimensional tensor G'' 1406 where there are C*L groups. It can be seen that this group convolution results in a three-dimensional tensor B' 1502 (equation (16)). While, as shown above, tensor B' comprises all of the gradients of the weight gradient tensor B, tensor B' 1502 is three-dimensional, and the weight-gradient tensor B is four-dimensional. Accordingly, in this example, block 906 of the method 900 may comprise reformatting the output of the group convolution (i.e. tensor B' 1502) so as to generate the weight gradient tensor B.

Figure 16:
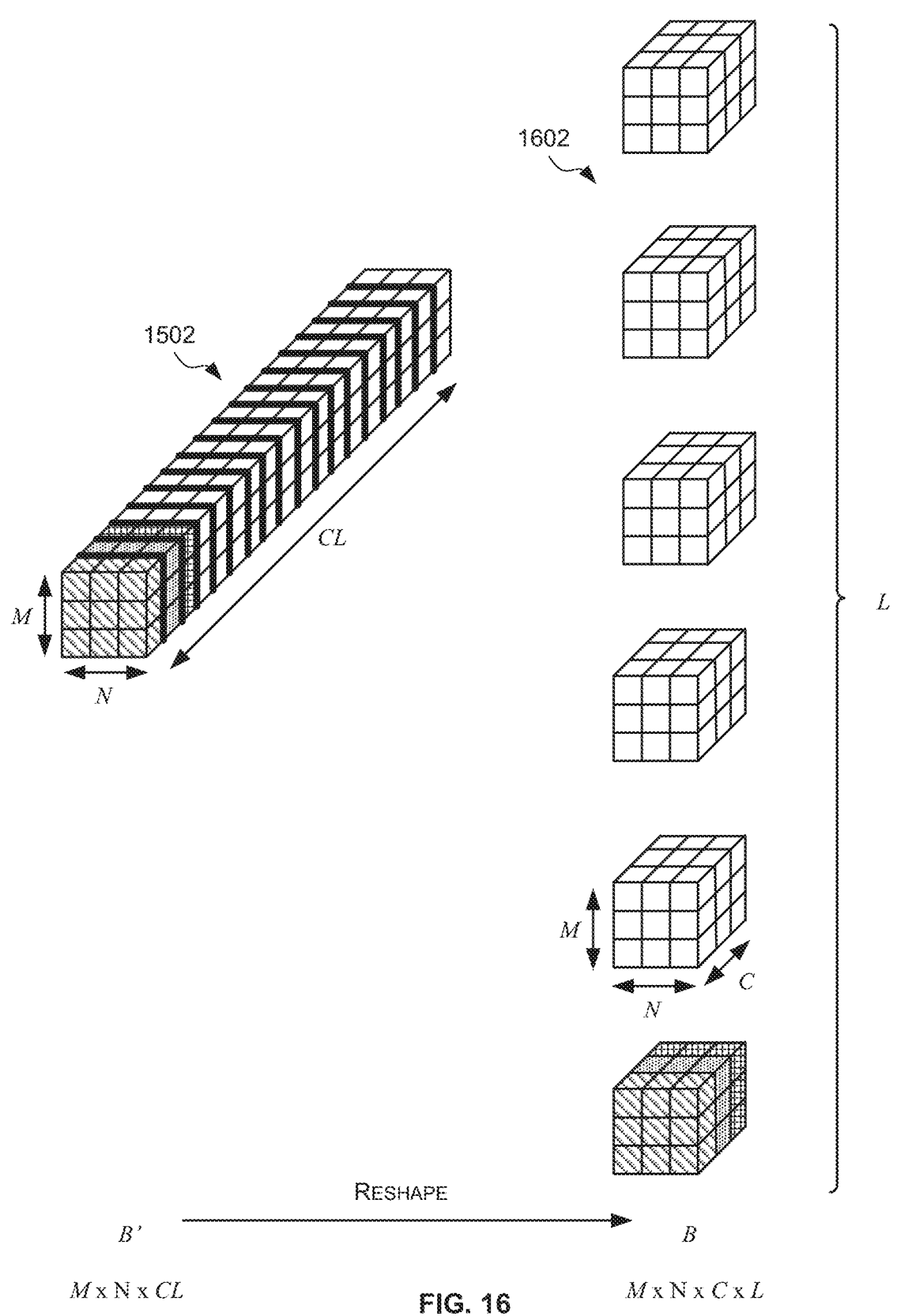
FIG. 16 is a schematic diagram illustrating an example method of reformatting the output of the group convolution of FIG. 15 to generate a weight gradient tensor that comprises the gradients of the loss metric for the DNN with respect to the weights of the convolution layer.

Reference is now made to FIG. 16 which illustrates an example method of generating the weight gradient tensor B 1602 from the output of the group convolution of FIG. 15 (tensor B' 1502). In this example method, the weight gradient tensor B 1602 is generated from the group convolution output (tensor B') by reshaping tensor B' 1502. The term reshaping a tensor comprises converting a tensor of o dimensions into a reshaped tensor of O+1 dimensions by splitting a dimension of the tensor. For example, a tensor of dimensions (M×N×CL) may be reshaped to a tensor of dimensions (M×N×C×L).

Similarly, it will be evident to a person of skill in the art that the three-dimensional tensor X' 1304 is simply an example of a three-dimensional tensor that can be used to generate the values of the weight gradient tensor via group convolution with a four-dimensional tensor, such as, but not limited to, tensor G" 1406, where there are C*L groups. For example, the three-dimensional tensor may be any three-dimensional tensor that comprises C*L channels which comprises L copies of each channel of the input tensor X 1302. In other words, the L copies of a channel of the input tensor X in the three-dimensional tensor do not have to be every $L^{th}$ channel, the channels of the input tensor X could be in a different order.

Similarly, it will be evident to a person of skill in the art that the tensor G" 1406 is just an example of a four-dimensional tensor that can be used to generate the values of the weight gradient tensor B via a group convolution with a three-dimensional tensor, such as X' 1304, wherein the group convolution has C*L groups, and other four-dimensional tensors can be used. Specifically, any four-dimensional tensor that comprises C copies of each channel of the output gradient tensor G wherein the channels are arranged so that each channel of the input tensor is convolved with each channel of the output gradient may be used. For example, if the first three-dimensional tensor comprises the L copies of a channel of the input tensor in succession, then the second four-dimensional tensor may comprise sets of L filters wherein each set comprises one filter that corresponds to each channel of the output gradient tensor G.

Where the method 900 comprises reformatting one or more of the input tensor X, the output gradient tensor G, and the output of the group convolution to generate the first three-dimensional tensor, the second four-dimensional tensor, and the weight gradient tensor respectively, in some cases, one or more of the reformatting steps (e.g. repeating, tiling, expanding and reshaping) may be performed by one or more convolution engines. For example, any repeating and/or tiling may be performed via one or more convolution engines. In other cases, one or more of the reformatting steps (e.g. repeating, tiling, expanding and reshaping) may be performed by general purpose logic. Specifically, tiling a tensor may be performed using the one or more convolution engines by convolving the tensor with a set of one-hot 1×1 filter which are 1 where they carry the input channel to the output and 0 otherwise. For example, to implement the tiling of G' 1004 C times as shown in FIG. 10 there would be L×C filters. Similarly, repetition of a tensor could be performed using the one or more convolution engines by performing a group convolution (e.g. as shown in FIG. 14) between the tensor and a unit 1×1 kernel with the number of filters equal to C×L.

In yet other cases, the hardware logic used to perform the method 900 may comprises a dedicated hardware unit, which may be referred to as a memory management module, which is capable of performing data manipulation, such as repeating, tiling, reshaping and/or expanding on a received tensor. A memory management module may be capable of receiving a multi-dimensional tensor (e.g. from memory) and re-shaping the manner/order in which those dimensions are presented/stored in memory. An example of a memory management module is described in the Applicant's UK patent application No. 2012814.6 which is herein incorporated by reference in its entirety. Using a dedicated hardware unit or module to perform one or more of the reformatting steps may significantly improve the efficiency of the method.

Convolution Layers that Implement Convolutions with Other Dimensions

Although the methods of determining the gradients of a loss metric of the DNN with respect to the weights of a convolution layer described above have been described with respect to a convolution layer that implements a 2D convolution, the described methods are not limited to convolution layers that implement a 2D convolution and may be similarly used for convolution layers that implement any Z-D convolution wherein Z is the dimension of the convolution and is an integer greater than or equal to one.

For example, as is known to those of skill in the art, a 1D convolution convolves a two-dimensional input tensor and a three-dimensional weight tensor comprising a set of two-dimensional filters. Each filter is slid or traversed over only one dimension of the input tensor (vs the two traversed dimensions for a 2D convolution). The method 900 of FIG. 9 described above can be used to determine the gradients of a loss metric of the DNN with respect to the weights of a convolution layer that implements a 1D convolution by converting the 1D convolution into a 2D convolution by adding a dummy dimension (i.e. the additional dimension has a value of 1) to the input tensor and the weight tensor (and thus the output tensor). For example, a two-dimensional input tensor (W×C) may be converted to a three-dimensional input tensor (H×W×C) wherein H=1 (which may be referred to as the augmented input tensor), and the three-dimensional weight tensor (N×C×L) may be converted to a four-dimensional weight tensor (M×N×C×L) wherein M=1 (which may be referred to as the augmented weight tensor). The output of the 2D convolution will also then have a dummy dimension. The gradients of a loss metric of the DNN with respect to the weights of a convolution layer that implements a 1D convolution can then be determined in the same manner as described above by performing a group convolution between a first three-dimensional tensor and a second four-dimensional tensor, the first three-dimensional tensor being formed of values from the augmented input tensor, and the second four-dimensional tensor being formed of values from the augmented output gradient tensor (i.e. the output gradient tensor with the additional dummy dimension).

As is known to those of skill in the art, a 3D convolution can be described as convolving a four-dimensional input tensor $X_4$ (H×W×$C_{in}$×0) and a five-dimensional weight tensor $K_5$ (M×N×$C_{in}$×$C_{out}$×$K_D$). The fourth and fifth dimensions of the input tensor $X_4$ and weight tensor $K_5$ respectively (i.e. O, $K_D$) are referred to as the depth dimension. The input tensor $X_4$ can be described as comprising O three-dimensional tensors (H×W×$C_{in}$) and each three-dimensional tensor may be referred to as a slice of the input tensor. The weight tensor $K_s$ may be described as comprising $K_D$ groups of three-dimensional filters (M×N×$C_{in}$), wherein each filter group comprises $C_{out}$ three-dimensional filters. Each group of filters may be referred to as a slice of the weight tensor.

The depth dimension of the weight tensor is smaller than or equal to the depth dimension of the input tensor (i.e. $K_D \leq 0$). So, each filter is slid or traversed over three dimensions of the input tensor (i.e. height, width and depth dimensions). The output of a 3D convolution is a four-dimensional tensor $Y_4$ (I×J×$C_{out}$×L). As described in the Applicant's co-pending UK Patent Application No. 2014932.4, which is herein incorporated by reference in its entirety, a 3D convolution can be represented as a set of 2D convolutions and summations.

Each neuron or element of the four-dimensional output tensor $Y_4$ (i, j, $c_{out}$, l) of a 3D convolution can be generated from the four-dimensional input tensor $X_4$ and the five-dimensional weight tensor $K_s$ in accordance with equation (20). For simplicity, in this example it is assumed that the stride is one in all dimensions and the dilation is one in all dimensions. However, the methods and techniques described herein are not limited to cases where the stride is one and dilation is one.

$$Y_4(i, j, c_{out}, l) =$$ \hfill (20)

$$\sum_{k_D=0}^{K_D-1} \sum_{m=0}^{M-1} \sum_{n=0}^{N-1} \sum_{c_{in}=0}^{C_{in}-1} X_4(i+m, j+n, c_{in}, l+k_D)K_5(m, n, c_{in}, c_{out}, k_D)$$

Equation (20) can be written as equation (21) which shows a 3D convolution can be represented by a plurality of 2D convolutions and summations. Specifically, it can be seen that the inner part of the calculation (inside the square brackets) is made up of a plurality of 2D convolution operations like those described above with respect to FIG. 4 and equation (1).

$$Y_4(i, j, c_{out}, l) =$$ \hfill (21)

$$\sum_{k_D=0}^{K_D-1} \left[ \sum_{m=0}^{M-1} \sum_{n=0}^{N-1} \sum_{c_{in}=0}^{C_{in}-1} X_4(i+m, j+n, c_{in}, l+k_D)K_5(m, n, c_{in}, c_{out}, k_D) \right]$$

Figure 17:
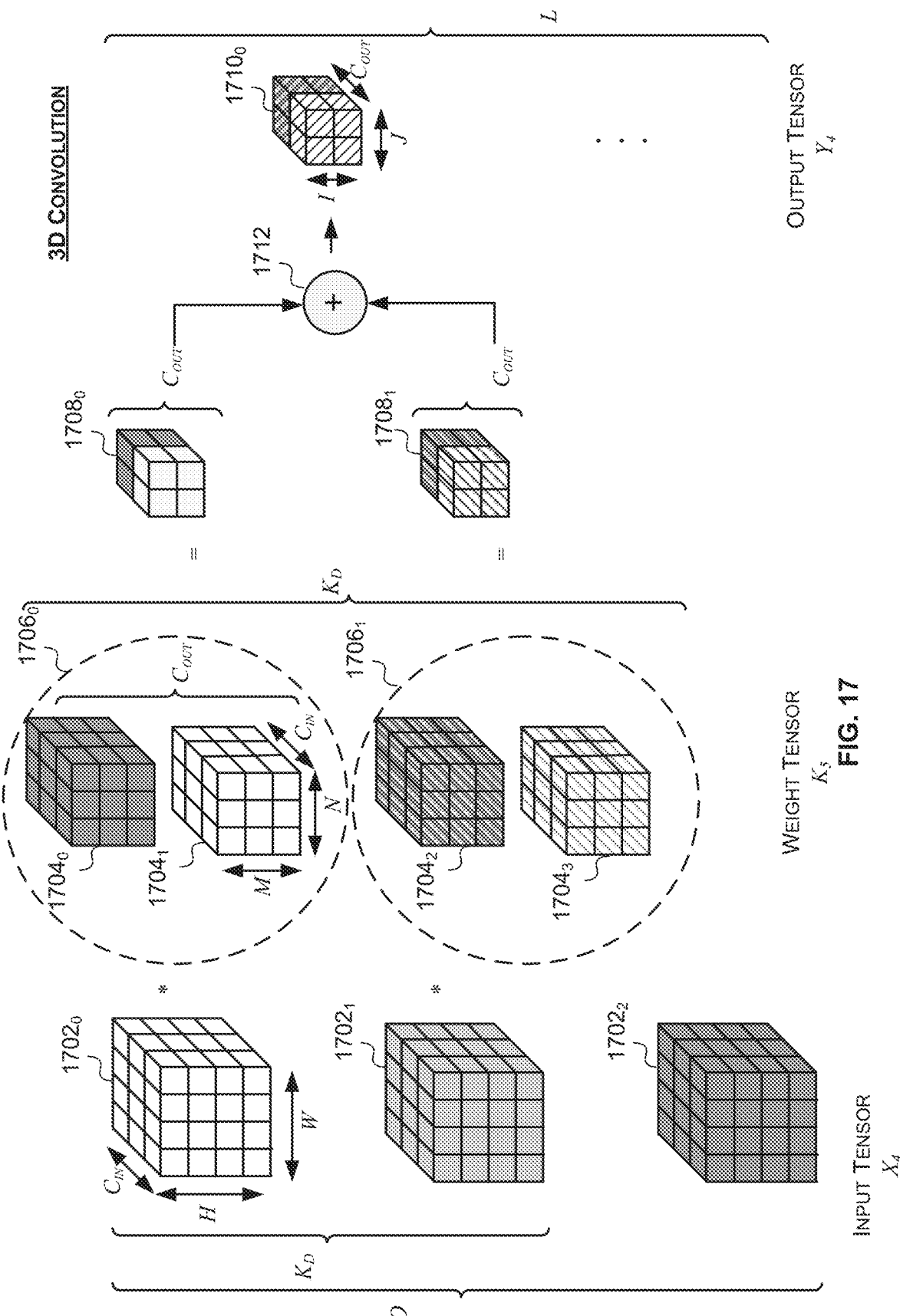
FIG. 17 is a schematic diagram illustrating a first example 3D convolution represented as a plurality of 2D convolutions and summations.

This will be illustrated visually using FIG. 17. Specifically, FIG. 17 shows a four-dimensional input tensor $X_4$ that has a depth of 3 (i.e. O=3) such that there are three slices of the input tensor $1702_0$, $1702_1$, $1702_2$; and a five-dimensional weight tensor $K_5$ wherein there are two slices of the weight tensor $1706_0$, $1706_1$ (i.e. $K_D$=2), and each slice $1706_0$, $1706_1$ comprises two 3-dimensional filters $1704_0$, $1704_1$ or $1704_2$, $1704_3$ (i.e. $C_{out}$=2). FIG. 17 shows the five-dimensional weight tensor $K_5$ in a first position (first shift) where the first slice of the weight tensor $1706_0$ is aligned with the first slice of the input tensor $1702_0$; and the second slice of the weight tensor $1706_1$ is aligned with the second slice of the input tensor $1702_1$.

When presented in this way, it can be seen that the calculation of the 3D convolution, for the first shift in the depth dimension, consists of two 2D convolutions (identified by a *) followed by an element-wise summation. The first slice of the input tensor $1702_0$ is convolved with the first slice of the weight tensor $1706_0$ (i.e. the first two filters $1704_0$, $1704_1$) to produce a first partial result $1708_0$. The second slice of the input tensor $1702_1$ is convolved with the second slice of the weight tensor $1706_1$ (i.e. the last two filters $1704_2$, $1704_3$) to produce a second partial result $1708_1$. Each of these partial results $1708_0$, $1708_1$ is equivalent to the result of a 2D convolution, such as that shown in FIG. 4. To produce the first slice of the output $1710_0$ for the 3D convolution for this shift of the weight tensor $K_5$, the two partial results $1708_0$ and $1708_1$ are summed by summation block 1712.

Then in a second shift (not shown) the first slice of the weight tensor $1706_0$ is aligned with the second slice of the input tensor $1702_1$ and the second slice of the weight tensor $1706_1$ is aligned with the third slice of the input tensor $1702_2$. Again, for this shift, there are two 2D convolutions followed by an element-wise summation. Specifically, the second slice of the input tensor $1702_1$ is convolved with the first slice of the weight tensor $1706_0$ (i.e. filters $1704_0$, $1704_1$) to produce a third partial result. The third slice of the input tensor $1702_2$ is convolved with the second slice of the weight tensor $1706_1$ (i.e. filters $1704_2$, $1704_3$) to produce a fourth partial result. To produce the second slice of the output for the 3D convolution for this shift of the weight tensor $K_5$, the two partial results are summed.

Figure 18:
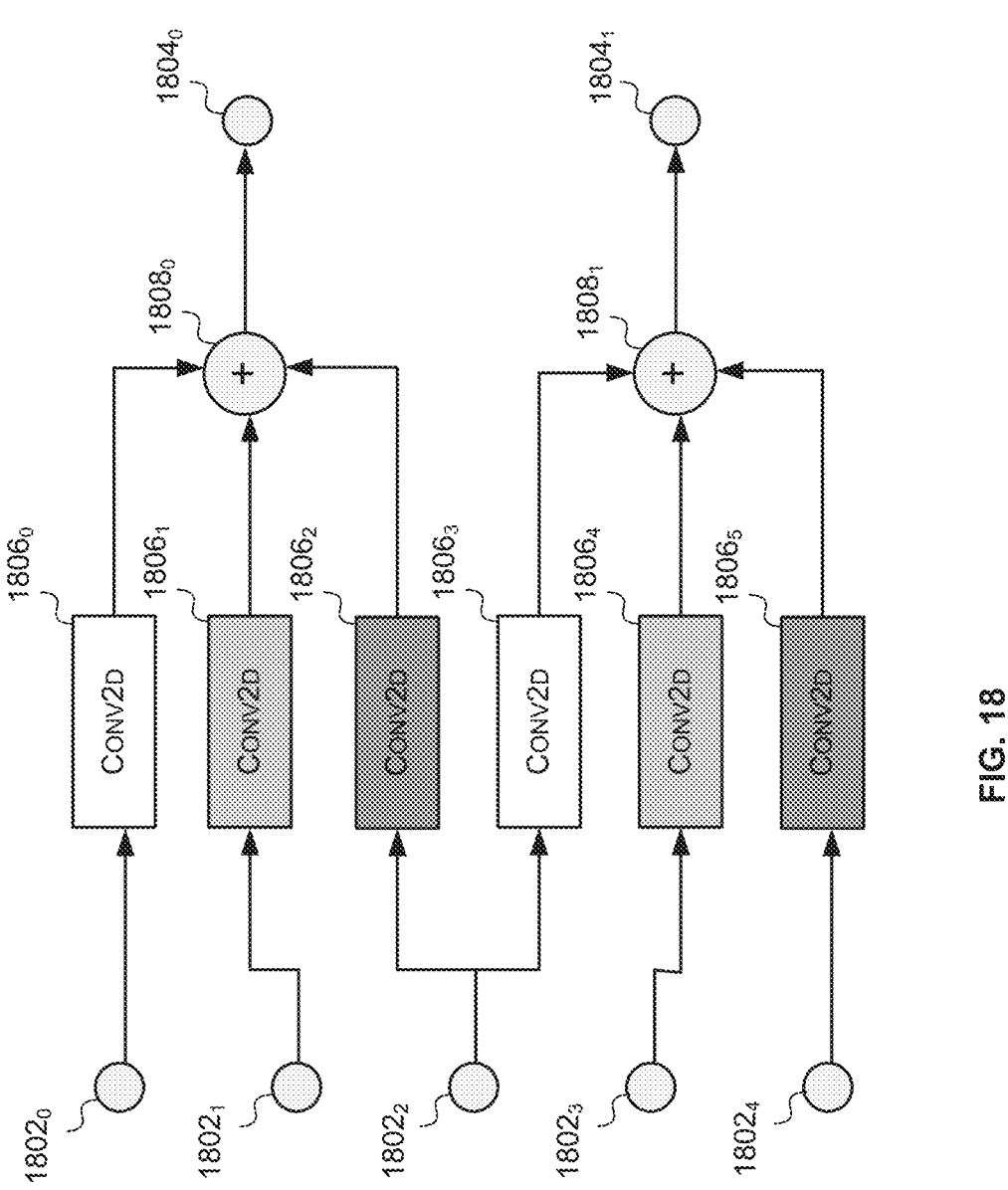
FIG. 18 is a computational graph illustrating a second example 3D convolution represented as a plurality of 2D convolutions and summations.

The restructuring of a 3D convolution in terms of multiple 2D convolutions can also be represented in the form of a computational graph. Neural networks may be envisaged as computational graphs; the advantage to this representation is that a 3D convolution in a neural network can be replaced with an equivalent computational sub-graph, making deployment on a NNA (neural network accelerator) supporting 2D convolutions and element-wise summation straightforward. An example of this is shown in FIG. 18. Here the input tensor is illustrated as comprising five constituent slices $1802_0$, $1802_1$, $1802_2$, $1802_3$, $1802_4$ (e.g. O=5). The weight tensor is represented as three slices (e.g. $K_D$=3). In this example, the stride in the depth dimensions, O, is 2. Based on these parameters, the output tensor can be represented as two output slices $1804_0$ and $1804_1$. The first output slice $1804_0$ can be produced by performing three 2D convolutions $1806_0$, $1806_1$, $1806_2$ in which the first three slices of the input tensor $1802_0$, $1802_1$, $1802_2$, are convolved with the first, second and third slices of the weight tensor. The outputs of these 2D convolutions are summed element-wise, at summation block $1808_0$, to produce the first slice of the output tensor $1804_0$.

The second slice of the output tensor $1804_1$ can likewise be produced by performing three 2D convolutions $1806_3$, $1806_4$, $1806_5$ in which the third, fourth and fifth slices of the input tensor $1802_2$, $1802_3$, $1802_4$, are convolved with the first, second and third slices of the weight tensor, respectively. The outputs of these 2D convolutions are summed element-wise, at summation block $1808_1$, to produce the second slice of the output tensor $1804_1$. Note that the weights in the 2D convolution $1806_0$ and the 2D convolution $1806_3$ are the same. In both cases these are the weights in the first slice of the weight tensor. Likewise, the weights in the 2D convolution $1806_1$ and the 2D convolution $1806_4$ are the same (the second slice of the weight tensor); and the weights in the 2D convolution $1806_2$ and the 2D convolution $1806_5$ are the same (the third slice of the weight tensor).

The gradients of a loss or error metric of a DNN with respect to the weights of a convolution layer that implements a 3D convolution may be determined by representing the 3D convolution as a set of 2D convolutions and summations (e.g. as described above); performing the method of FIG. 9 for each 2D convolution, where the first three-dimensional tensor is formed of the set of values in the slice of the input tensor used in that 2D convolution, and the second four-dimensional filter is formed of the set of values of the output gradient tensor for the convolution layer that relate to the relevant slice of the output tensor; and combining the group convolution outputs that relate to the same weights. This will be described in more detail with reference to FIGS. 18 and 19.

Figure 19:
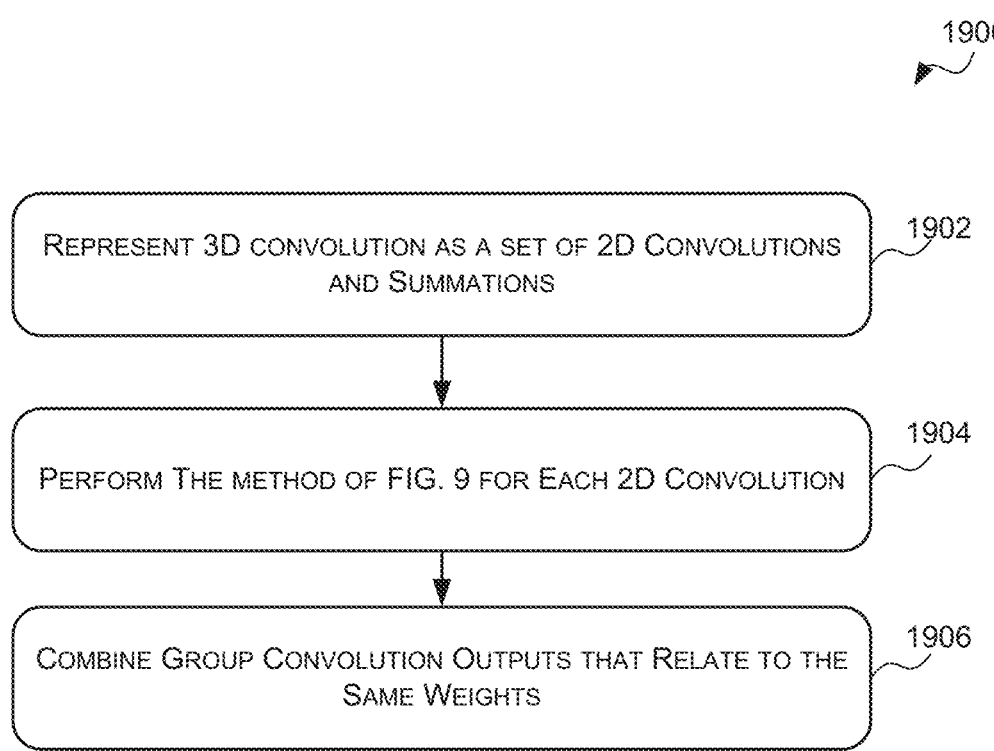
FIG. 19 is a flow diagram of an example method of generating the gradients of the loss metric for a DNN with respect to the weights of a convolution layer that implements a 3D convolution using the method of FIG. 9.

Reference is now made to FIG. 19 which illustrates an example method 1900 of identifying the gradients of a loss or error metric of a DNN with respect to the weights of a convolution layer that implements a 3D convolution using the method 900 of FIG. 9. The method 1900 begins at block 1902 where the 3D convolution is represented (for example, using the method described above) as a set of 2D convolutions and summations. Each 2D convolution is between a group or slice of the input tensor and a group or slice of the weight tensor. For example, as shown in FIG. 18 and described above, a 3D convolution between an input tensor divided into five input slices or groups $1802_0$, $1802_1$, $1802_2$, $1802_3$, $1802_4$ and a weight tensor divided into three slices or groups of sub-filters, and the stride in the O dimension is two can be represented by the 2D convolutions shown in Table 1.

TABLE 1

| 2D Convolution | Inputs | Weights | Summation | Related Output |
|---|---|---|---|---|
| First $1806_0$ | First Slice of Input Tensor $1802_0$ | First Slice of Weight Tensor | First $1808_0$ | First Slice of Output Tensor $1804_0$ |
| Second $1806_1$ | Second Slice of Input Tensor $1802_1$ | Second Slice of Weight Tensor | First $1808_0$ | First Slice of Output Tensor $1804_0$ |
| Third $1806_2$ | Third Slice of Input Tensor $1802_2$ | Third Slice of Weight Tensor | First $1808_0$ | First Slice of Output Tensor $1804_0$ |
| Fourth $1806_3$ | Third Slice of Input Tensor $1802_2$ | First Slice of Weight Tensor | Second $1808_1$ | Second Slice of Output Tensor $1804_1$ |
| Fifth $1806_4$ | Fourth Slice of Input Tensor $1802_3$ | Second Slice of Weight Tensor | Second $1808_1$ | Second Slice of Output Tensor $1804_1$ |
| Sixth $1806_5$ | Fifth Slice of Input Tensor $1802_4$ | Third Slice of Weight Tensor | Second $1808_1$ | Second Slice of Output Tensor $1804_1$ |

At block 1904, once the 3D convolution is represented as a set of 20 convolutions and summations, the method 900 of FIG. 9 is performed for each 20 convolution wherein the first three-dimensional tensor of the group convolution is formed of the set of values of the input tensor relevant to the 20 convolution (i.e. the input slice relevant to that 20 convolution), and the second four-dimensional tensor of the group convolution is formed of the set of values of the output gradient tensor that correspond to the relevant output slice (i.e. the values of the output gradient tensor that correspond to the output slice that the 20 convolution output is used to generate). For example, the first 20 convolution 1806₀ of FIG. 18 is performed between the first slice of the input tensor 1802₀ and the first slice of the weight tensor, and the output thereof is used to generate the first slice of the output tensor 1804₀. Therefore, the group convolution for the first 20 convolution 1806₀ is performed between a first three dimensional tensor-formed of the set of values in the first slice of the input tensor, and a second four-dimensional tensor formed of the set of values of the output gradient tensor G that correspond to the first slice of the output tensor 1804₀. Table 2 provides a complete list of the group convolutions that may be performed for a 3D convolution which can be represented by the 20 convolutions and summations set out in FIG. 18 and Table 1.

TABLE 2

| Group Convolution | Corresponding 2D Convolution | First 3D Tensor Generated from | Second 4D Tensor Generated from |
|---|---|---|---|
| First | First $1806_0$ | First Slice of Input Tensor $1802_0$ | Values of the Output Gradient Tensor corresponding to the first slice of the output tensor |
| Second | Second $1806_1$ | Second Slice of Input Tensor $1802_1$ | Values of the Output Gradient Tensor corresponding to the first slice of the output tensor |
| Third | Third $1806_2$ | Third Slice of Input Tensor $1802_2$ | Values of the Output Gradient Tensor corresponding to the first slice of the output tensor |
| Fourth | Fourth $1806_3$ | Third Slice of Input Tensor $1802_2$ | Values of the Output Gradient Tensor corresponding to the second slice of the output tensor |
| Fifth | Fifth $1806_4$ | Fourth Slice of Input Tensor $1802_3$ | Values of the Output Gradient Tensor corresponding to the second slice of the output tensor |
| Sixth | Sixth $1806_5$ | Fifth Slice of Input Tensor $1802_4$ | Values of the Output Gradient Tensor corresponding to the second slice of the output tensor |

The first three-dimensional tensor and the second four-dimensional tensor used in a group convolution can be generated from the relevant set of values of the input tensor and the relevant set of values of the output gradient tensor in any of the manners described above. Once the method 900 of FIG. 9 has been performed for each 2D convolution, the method 1900 proceeds to block 1906.

At block 1906, the outputs of the group convolutions that are related to the same weights are combined to generate gradients of the loss or error metric for the DNN with respect to those weights. For example, in the example shown in FIG. 18 and Table 1 the first and fourth 2D convolutions 1806₀ and 1806₃ use the same weights (the first slice of the weight tensor). Thus, the outputs of the first and fourth group convolutions are combined (e.g. summed element wise) to generate gradients of the loss or error metric for the DNN with respect to those weights. Similarly, the second and fifth 2D convolutions 1806₁ and 1806₄ use the same weights, so the output of the second and fifth group convolutions are combined; and the third and sixth 2D convolutions 1806₂ and 1806₅ use the same weights, so the output of the third and sixth group convolutions are combined. Once the relevant group convolution outputs are combined, the method 1900 ends.

Although it has been described above how to represent a 3D convolution by a set of 2D convolutions and summations, any convolution of a dimension greater than or equal to 3 may be converted into a set of 2D convolutions and summations in a similar manner. Therefor the method of FIG. 19 may be used to determine the gradients of a loss or error metric of the DNN with respect to the weights of a convolution layer that implements a convolution of three dimensions or higher.

Therefore the method 900 of FIG. 9 for identifying the gradients of a loss or error metric of the DNN with respect to the weights of a convolution layer of a DNN, can be generalised as performing one or more group convolutions, each group convolution between a first y-dimensional tensor and a second z-dimensional tensor wherein z=y+1, the first y-dimensional tensor being formed of a set of values from the input tensor, and the second z-dimensional tensor being formed of a set of values from an output gradient tensor comprising gradients of the loss metric for the DNN with respect to the output values of the convolution layer. The number of group convolutions that are performed may be based on the dimension of the convolution implemented by the convolution layer and/or one or more other factors. For example, for a 1D or 2D convolution, a single group convolution may be performed as described above, whereas for a 3D convolution (or a convolution with a degree higher than 3) multiple group convolutions may be performed, and the output thereof combined.

Training a DNN

Reference is now made to FIG. 20 which illustrates an example method 2000 of training a DNN using the method described above for determining the gradients of the loss metric with respect to the weights of a convolution layer of the DNN. The method 2000 begins at block 2002 where the output of a model of the DNN in response to input data (e.g. training data) is determined. The training data may be selected so as to configure the DNN to perform a specific function. The method 2000 then proceeds to block 2004 where an error or loss metric E is determined based on the output of the DNN. At block 2006, gradients of the error or loss metric E with respect to the outputs of a convolution layer of the DNN is determined (e.g. the output gradient tensor G for a convolution layer is determined). There are many known methods for generating the gradients of the error or loss metric E with respect to the outputs of a convolution layer. Then at block 2008, the gradients of the error or loss metric E with respect to the weights of the convolution layer may be determined in accordance with the method 900 of FIG. 9 or the method 1900 of FIG. 19. Then at block 2010, the weights of the convolution layer may be adjusted based on the gradients of the error or loss metric with respect to the weights.

In some cases, blocks 2006 to 2010 may be implemented for each convolution layer of the DNN. The method 2000 of FIG. 20 may be repeated multiple times. In some cases, the method 2000 of FIG. 20 may be repeated until the error or loss metric E converges. Once a set of adjusted weights have been identified, hardware logic configurable to implement a DNN (e.g. a DNN accelerator) may be configured to implement the DNN using the adjusted or trained weights.

As known to those of skill in the art, generating the gradients of the error or loss metric E with respect to the outputs (i.e. the elements of the output tensor) of a convolution layer in block 2006 may comprise generating the gradients of the loss metric with respect to the inputs (i.e. the element of the input tensor) of a subsequent convolution layer in the DNN. For example, if a DNN comprises a first convolution layer that is subsequently followed (either directly or indirectly) by a second convolution layer, generating the gradients of the loss or error metric E with respect to the outputs (i.e. the elements of the output tensor) of the first convolution layer may comprise generating the gradients of the loss or error metric E with respect to the inputs (i.e. the elements of the input tensor) to the second convolution layer.

In some cases, the gradients of the loss or error metric E with respect to the inputs (i.e. the element of the input tensor) of a convolution layer $$\left(\frac{\partial E}{\partial X(h, w, c)}\right)$$

may be determined by performing a convolution transpose operation between the weights K of the convolution layer and the values of the output gradient tensor G for the convolution layer. Let V, which may be referred to as the input gradient tensor, represent the gradients of the loss or error metric E with respect to the inputs as shown in equation (22).

$$V(h, w, c) = \frac{\partial E}{\partial X(h, w, c)} \quad (22)$$

As described in the Applicant's published patent application GB2582352A, which is herein incorporated by reference in its entirety, a convolution transpose operation between a filter and an input tensor can be performed efficiently in hardware, such as a DNN accelerator, with one or more convolution engines, by performing a plurality of direct convolutions on the input tensor and interleaving the output of the direct convolutions to generate the output of the convolution transpose. Specifically, the filter is divided into a plurality of sub-filters; a convolution operation is performed between each sub-filter and the input tensor to generate a sub-output tensor; and the elements of the sub-output tensors are interleaved to generate the final output. As described in GB2582352A, implementing a convolution transpose operation in this manner allows a convolution transpose operation to be implemented efficiently in hardware, such as a DNN accelerator, with one or more convolution engines, not only because it can take advantage of how efficiently the convolution engines can perform a convolution operation, but there are also no intermediate results that have to be stored.

This method can be described with reference to FIGS. 21-23 which illustrate an example one dimensional (1D) convolution between a 10-element input tensor P 2102 and a 3-weight filter D and the corresponding convolution transpose. A convolution operation can typically be represented as a matrix multiplication between an input vector $P^V$ and a sparse matrix S as shown in equation (23) where the non-zero elements of the sparse matrix S are the weights k of the filter. The input vector $P^V$ is the elements of the input tensor unrolled from left to right and top to bottom (and front to back if 3D).

$$Q^V = P^V * S \qquad (23)$$

In contrast, a convolution transpose layer (which may also be referred to as a deconvolution layer, a transpose convolution layer, or a fractionally strided convolution layer) performs the reverse operations of a convolution. Specifically, in a convolution transpose layer the input tensor P is processed by transposing the sparse matrix S for the corresponding direct convolution to generate a transposed sparse matrix $S^T$ and performing a matrix multiplication between the input vector $P^V$ and the transposed sparse matrix $S^T$ as shown in equation (24).

$$Q^V = P^V * S^T \qquad (24)$$

Figure 21:
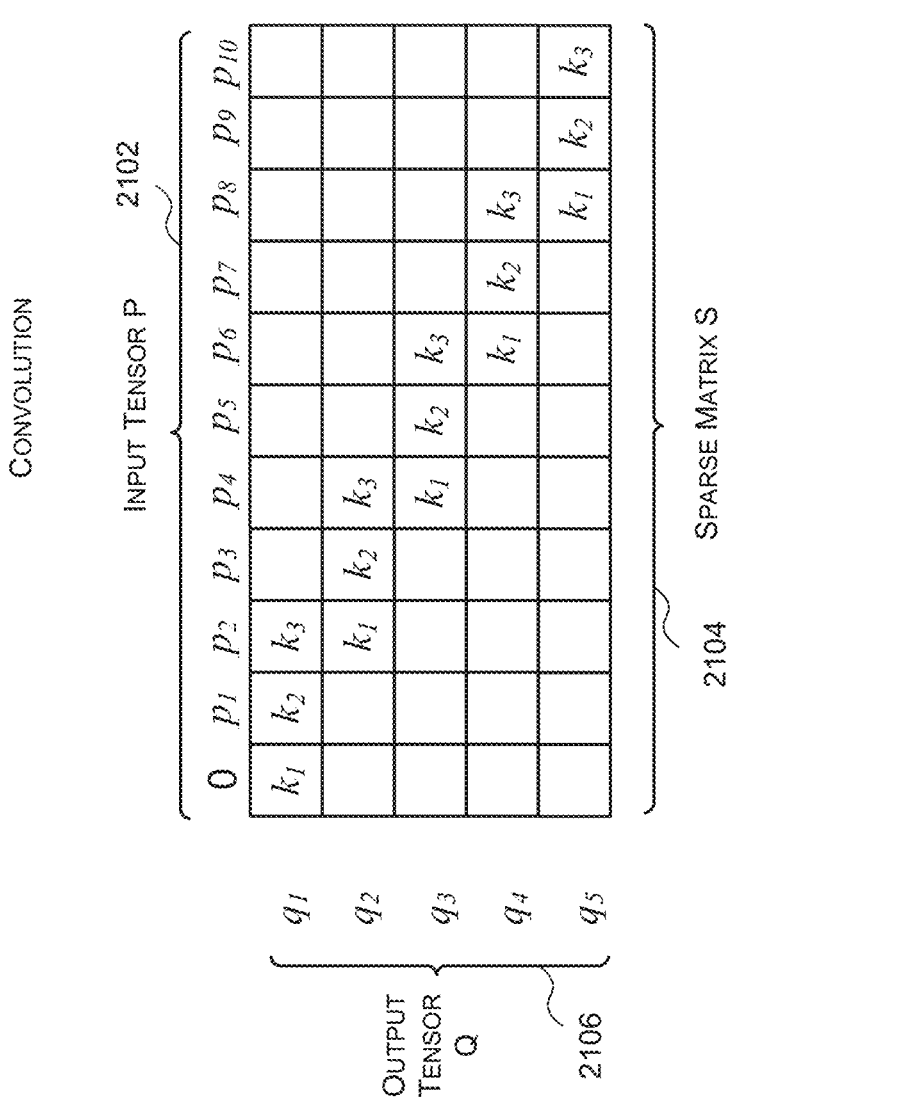
FIG. 21 is a schematic diagram illustrating an example one-dimensional convolution between an input tensor and a filter in vector-matrix format.

FIG. 21 illustrates a 1D convolution between a 10-element input tensor $P = [0 \ p_1 \ p_2 \ p_3 \ p_4 \ p_5 \ p_6 \ p_7 \ p_8 \ p_9 \ p_{10}]$ 2102 with a leading padding zero and a 3-weight filter $D = [k_1 \ k_2 \ k_3]$ with a stride of 2 in the width direction that produces a 5-element output tensor $Q = [q_1 \ q_2 \ q_3 \ q_4 \ q_5]$ 2106. The output tensor is generated by sliding the filter D over the input tensor P 2102 at two element increments and generating the dot product of the input elements and the weights at each position. Specifically, the $i^{th}$ output element $q_i$ is equal to the dot product of the input values and filter weights when the first filter weight $k_1$ is aligned with the $(i*stride)-1)^{th}$ input element. For example, the $1^{st}$ output element $k_1$ of the output tensor is equal to the dot product of the input elements and the filter weights when the $1^{st}$ filter weight $k_1$ is aligned with the $0^{th}$ input element; and the $2^{nd}$ output element $q_2$ is equal to the dot product of the input elements and the filter weights when the $1^{st}$ filter weight $k_1$ is aligned with the $2^{nd}$ input element $p_2$. As described above, such a convolution can be expressed as a matrix multiplication between the corresponding input vector P and a sparse matrix S 2104.

Figure 22:
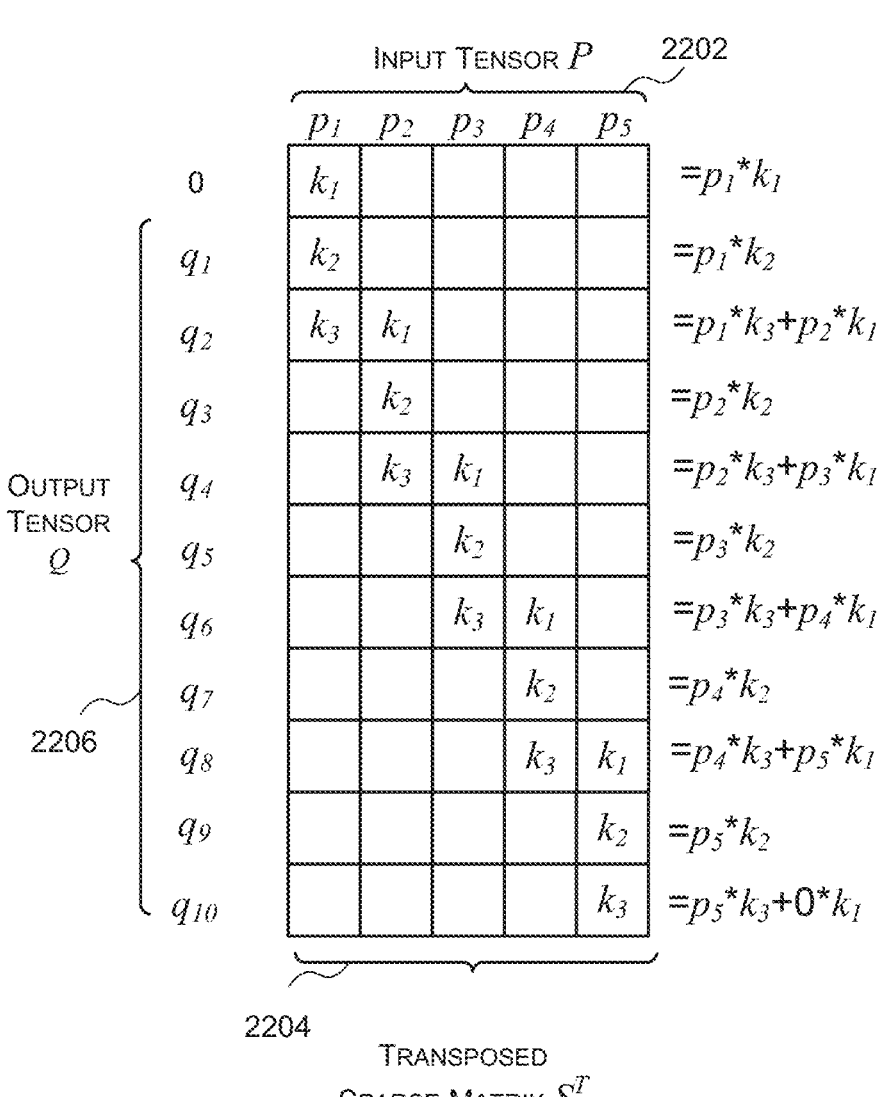
FIG. 22 is a schematic diagram illustrating an example one-dimensional convolution transpose between an input tensor and the filter of FIG. 21 in vector-matrix format.

FIG. 22 illustrates the corresponding convolution transpose operation (i.e. a convolution transpose between a 5-element input tensor $P = [p_1 \ p_2 \ p_3 \ p_4 \ p_5]$ 2202 and the 3-weight filter $D = [k_1 \ k_2 \ k_3]$ of FIG. 21 that produces a 10-element output tensor $Q = [q_1 \ q_2 \ q_3 \ q_4 \ q_5 \ q_6 \ q_7 \ q_8 \ q_9 \ q_{10}]$ 2206. As described above, a convolution transpose operation can be expressed as a matrix multiplication between an input vector P and the transposed sparse matrix $S^T$ 2204. As is shown in FIG. 23, the convolution transpose operation is equivalent to padding the input tensor P with zeros between each element so that the input elements are spaced apart by the stride in the width and height directions and on one or more edges, and convolving the padded input tensor $P^P$ with a reflected version of the filter $D^R$.

Figure 23:
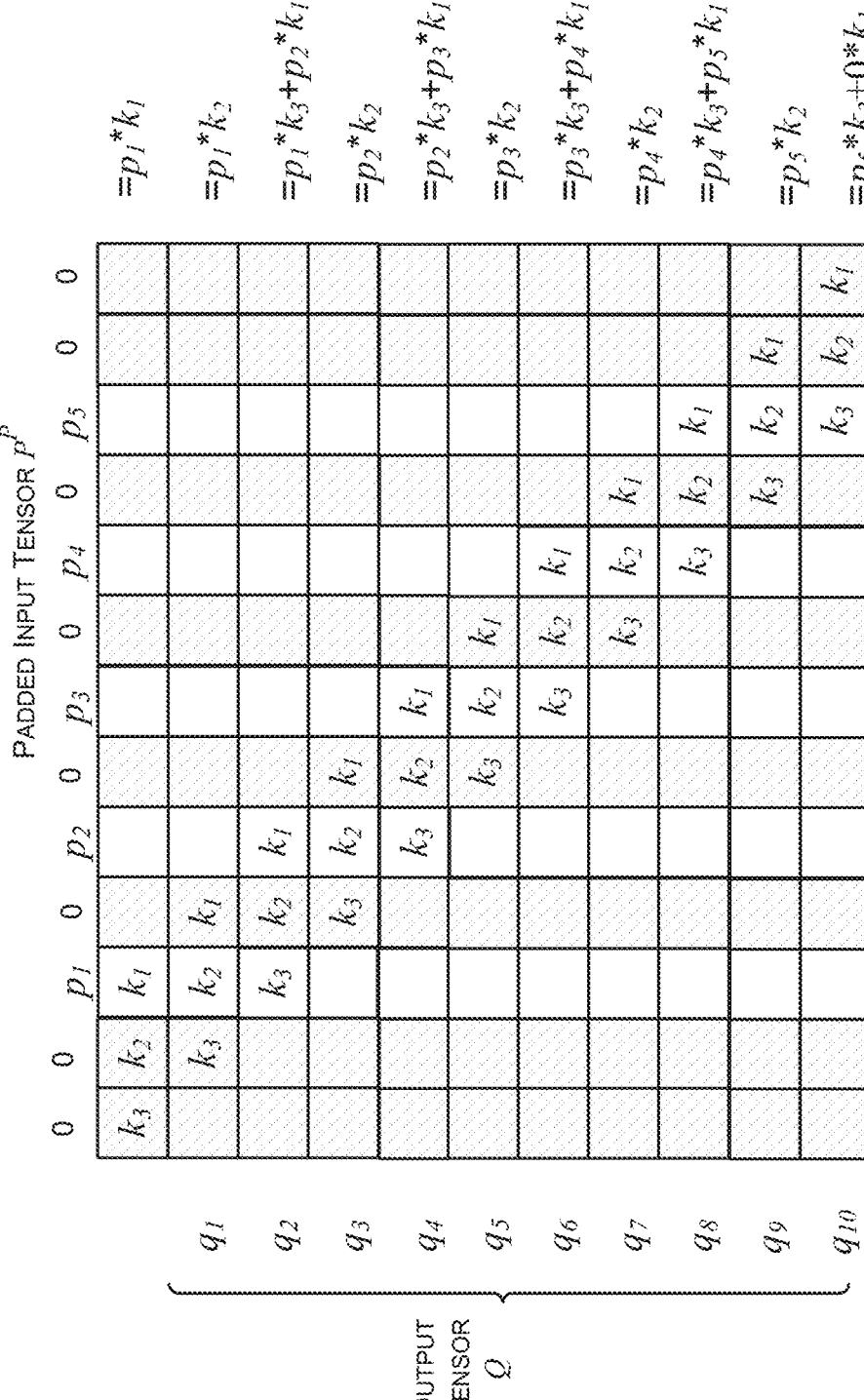
FIG. 23 is a schematic diagram illustrating the one-dimensional convolution transpose of FIG. 22 as a direct convolution of the reflected filter and a padded input tensor in vector-matrix format.
Figure 24:
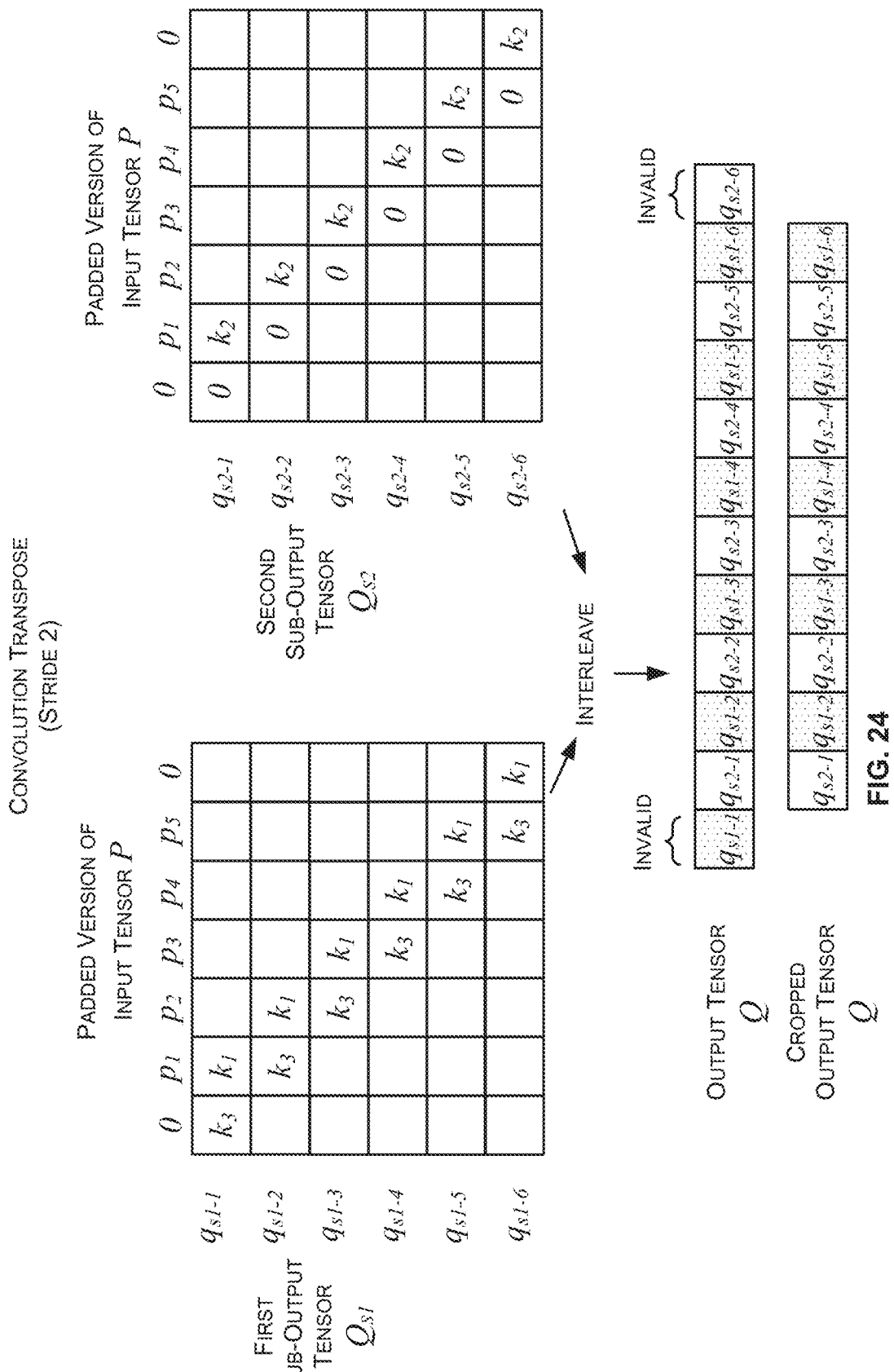
FIG. 24 is a schematic diagram illustrating the one-dimensional convolution transpose of FIG. 21 implemented as a plurality of direct convolutions.

It can be seen in FIGS. 22 and 23 that each even output element is equal to the dot product of the $i^{th}$ and $(i+1)^{th}$ input elements and the third and first filter weights $k_3$ and $k_1$, wherein $i = n/2$ and n is the output element number. Accordingly, the even output elements can be generated by performing a direct convolution between the input tensor P and a first sub-filter $D_{s1} = [k_3 \ k_1]$. Similarly, each odd output element is equal to the product of the $i^{th}$ input element $p_i$ and the second filter weight $k_2$, wherein $i = (n+1)/2$ and n is the output element number. Accordingly the odd output elements can be generated by performing a direct convolution between the input tensor P and a second sub-filter $D_{s2} = [0 \ k_2]$. The final output tensor Q of the convolution transpose can then be generated by interleaving the outputs of the first convolution and the second convolution as shown in FIG. 24. Specifically, the final output tensor Q of the convolution transpose can be generated by alternating between the outputs of the first and second convolutions.

The method described in GB2582352A may be used to efficiently calculate the input gradient tensor V. Specifically, the input gradient tensor V can be generated by dividing each filter of the weight tensor K into a plurality of sub-filters; a convolution operation is performed between each sub-filter and the output gradient tensor G to generate a sub-output tensor; and the elements of the sub-output tensors related to the same filter are interleaved to generate a layer or channel of the input gradient tensor V. For example, let there be a weight tensor K that comprises a first filter which is divided into two sub-filters, and a second filter which is divided into two sub-filters. The two sub-filters of the first filter are convolved with the output gradient tensor to produce two sub-output tensors. The elements of these two sub-output tensors are then interleaved to form a first channel of the input gradient tensor V. Then the two-sub-filters of the second filter are convolved with the output gradient tensor G to produce two sub-output tensors. The elements of these two sub-output tensors are then interleaved to form a second channel of the input gradient tensor V.

It will be evident to a person of skill in the art that the methods and techniques described above for determining the gradients of a loss metric of a DNN with respect to the weights of a convolution layer of the DNN are not limited to use in determining the gradients for a convolution layer that is part of a DNN, but can be used to determine the gradients for any convolution layer that is part of any neural network. Similarly, it will be evident to a person of skill in the art that the methods described above for training a DNN are not limited to use with a DNN, and can be used to train any neural network.

Example DNN Accelerator

Figure 25:
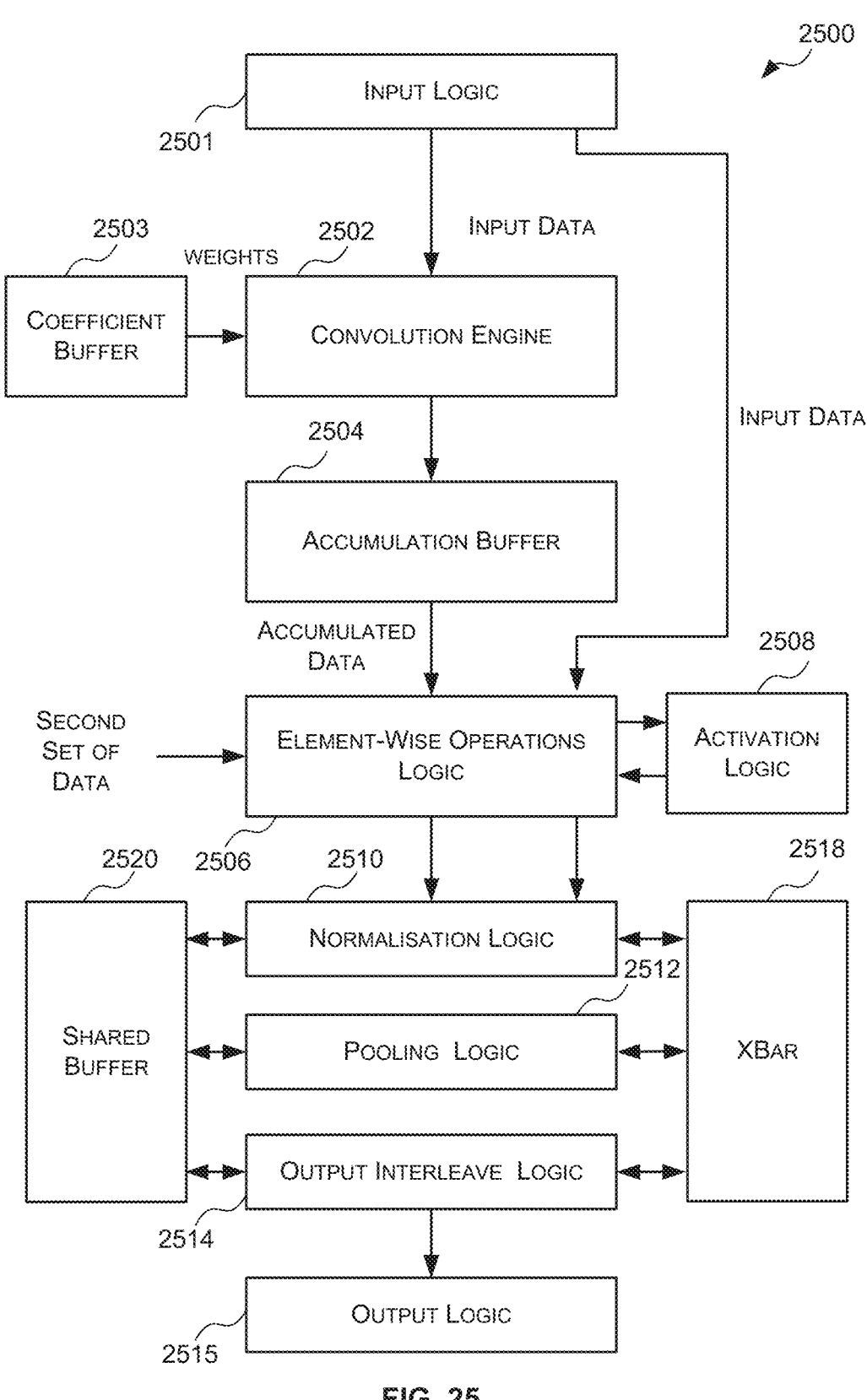
FIG. 25 is a block diagram of an example DNN accelerator.

Reference is now made to FIG. 25 which illustrates example hardware logic which can be configured to implement a DNN and to implement the method 900 of FIG. 9 or the method 1900 of FIG. 19 to determine the gradients of an error or loss metric with respect to the weights of a convolution layer of a DNN. Specifically, FIG. 25 illustrates an example DNN accelerator 2500.

The DNN accelerator 2500 of FIG. 25 is configured to compute the output of a DNN through a series of hardware passes (which also may be referred to as processing passes) wherein during each pass the DNN accelerator receives at least a portion of the input data for a layer of the DNN and processes the received input data in accordance with that layer (and optionally in accordance with one or more following layers) to produce processed data. The processed data is either output to memory for use as input data for a subsequent hardware pass or output as the output of the DNN. The number of layers that the DNN accelerator can process during a single hardware pass may be based on the size of the data, the configuration of the DNN accelerator and the order of the layers. For example, where the DNN accelerator comprises hardware logic to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example DNN accelerator 2500 of FIG. 25 comprises input logic 2501, a convolution engine 2502, an accumulation buffer 2504, element-wise operations logic 2506, activation logic 2508, normalisation logic 2510, pooling logic 2512, output interleave logic 2514 and output logic 2515. Each logic component or engine implements or processes all or a portion of one or more types of layers. Specifically, together the convolution engine 2502 and the accumulation buffer 2504 can implement or process a convolution layer or a fully connected layer. The activation logic 2508 can process or implement an activation layer. The normalisation logic 2510 processes or implement a normalisation layer. The pooling logic 2512 can implement a pooling layer and the output interleave logic 2514 can perform interleaving of tensors.

The input logic 2501 is configured to receive the input data to be processed and provides it to a downstream logic component for processing. The input logic 2501 may comprise a memory interface which is configured to receive the data to be processed by the downstream logic component from memory, and/or an input buffer for storing the input data for a layer. In some cases the input logic 2501 may also receive the weights of a layer and store the received weights in the coefficient buffer 2503.

The convolution engine 2502 is configurable to perform a convolution operation on the received input data using the weights associated with a particular convolution layer. The weights for each convolution layer of the DNN may be stored in a coefficient buffer 2503 as shown in FIG. 25 and the weights for a particular convolution layer may be provided to the convolution engine 2502 when that particular convolution layer is being processed by the convolution engine 2502. Where the DNN accelerator supports variable weight formats then the convolution engine 2502 may be configured to receive information indicating the format or formats of the weights of the current convolution layer being processed to allow the convolution engine 2502 to properly interpret and process the received weights.

The convolution engine 2502 may comprise a plurality of multipliers (e.g. 128) and a plurality of adders which add the results of the multipliers to produce a single sum. Although a single convolution engine 2502 is shown in FIG. 25, in other examples there may be multiple (e.g. 8) convolution engines so that multiple windows can be processed simultaneously. The output of the convolution engine 2502 is fed to the accumulation buffer 2504.

The accumulation buffer 2504 is configured to receive the output of the convolution engine and add it to the current contents of the accumulation buffer 2504. In this manner, the accumulation buffer 2504 accumulates the results of the convolution engine 2502 over several hardware passes of the convolution engine 2502. Although a single accumulation buffer 2504 is shown in FIG. 25, in other examples there may be multiple (e.g. 8, one per convolution engine) accumulation buffers. The accumulation buffer 2504 outputs the accumulated result to the element-wise operations logic 2506 which may or may not operate on the accumulated result depending on whether an element-wise layer is to be processed during the current hardware pass.

The element-wise operations logic 2506 is configurable to receive either the input data for the current hardware pass (e.g. when a convolution layer is not processed in the current hardware pass) or the accumulated result from the accumulation buffer 2504 (e.g. when a convolution layer is processed in the current hardware pass). The element-wise operations logic 2506 may either process the received input data or pass the received input data to other logic (e.g. the activation logic 2508 and/or or the normalisation logic 2510) depending on whether an element-wise layer is processed in the current hardware pass and/or depending on whether an activation layer is to be processed prior to an element-wise layer. When the element-wise operations logic 2506 is configured to process the received input data the element-wise operations logic 2506 performs an element-wise operation on the received data (optionally with another data set (which may be obtained from external memory)). The element-wise operations logic 2506 may be configurable to perform any suitable element-wise operation such as, but not limited to add, multiply, maximum, and minimum. The result of the element-wise operation is then provided to either the activation logic 2508 or the normalisation logic 2510 depending on whether an activation layer is to be processed subsequent the element-wise layer or not.

The activation logic 2508 is configured to receive one of the following as input data: the original input to the hardware pass (via the element-wise operations logic 2506) (e.g. when a convolution layer is not processed in the current hardware pass); the accumulated data (via the element-wise operations logic 2506) (e.g. when a convolution layer is processed in the current hardware pass and either an element-wise layer is not processed in the current hardware pass or an element-wise layer is processed in the current hardware pass but follows an activation layer). The activation logic 2508 is configurable to apply an activation function to the input data and provide the output data back to the element-wise operations logic 2506 where it is forwarded to the normalisation logic 2510 directly or after the element-wise operations logic 2506 processes it. In some cases, the activation function that is applied to the data received by the activation logic 2508 may vary per activation layer. In these cases, information specifying one or more properties of an activation function to be applied for each activation layer may be stored (e.g. in memory) and the relevant information for the activation layer processed in a particular hardware pass may be provided to the activation logic 2508 during that hardware pass.

In some cases, the activation logic 2508 may be configured to store, in entries of a lookup table, data representing the activation function. In these cases, the input data may be used to lookup one or more entries in the lookup table and output values representing the output of the activation function. For example, the activation logic 2508 may be configured to calculate the output value by interpolating between two or more entries read from the lookup table.

In some examples, the activation logic 2508 may be configured to operate as a Rectified Linear Unit (ReLU) by implementing a ReLU function. In a ReLU function, the output element $y_{i,j,k}$ is calculated by identifying a maximum value as set out in equation (25) wherein for x values less than 0, y=0:

$$y_{i,j,k} = f(x_{i,j,k}) = \max\{0, x_{i,j,k}\} \qquad (25)$$

In other examples, the activation logic 2508 may be configured to operate as a Parametric Rectified Linear Unit (PReLU) by implementing a PReLU function. The PReLU function performs a similar operation to the ReLU function. Specifically, where $w_1$, $w_2$, $b_1$, $b_2 \in \mathbb{R}$ are constants, the PReLU is configured to generate an output element $y_{i,j,k}$ as set out in equation (26):

$$y_{i,j,k} = f(x_{i,j,k}; w_1, w_2, b_1, b_2) = \max\{(w_1 * x_{i,j,k} + b_1),$$
$$(w_2 * x_{i,j,k} + b_2)\} \qquad (26)$$

The normalisation logic 2510 is configurable to receive one of the following as input data: the original input data for the hardware pass (via the element-wise operations logic 2506) (e.g. when a convolution layer is not processed in the current hardware pass and neither an element-wise layer nor an activation layer is processed in the current hardware pass); the accumulation output (via the element-wise operations logic 2506) (e.g. when a convolution layer is processed in the current hardware pass and neither an element-wise layer nor an activation layer is processed in the current hardware pass); and the output data of the element-wise operations logic and/or the activation logic. The normalisation logic 2510 then performs a normalisation function on the received input data to produce normalised data. In some cases, the normalisation logic 2510 may be configured to perform a Local Response Normalisation (LRN) Function and/or a Local Contrast Normalisation (LCN) Function. However, it will be evident to a person of skill in the art that these are examples only and that the normalisation logic 2510 may be configured to implement any suitable normalisation function or functions. Different normalisation layers may be configured to apply different normalisation functions.

The pooling logic 2512 may receive the normalised data from the normalisation logic 2510 or may receive the input data to the normalisation logic 1410 via the normalisation logic 2510. In some cases, data may be transferred between the normalisation logic 2510 and the pooling logic 2512 via a crossbar ("XBar") 2518. The term crossbar is used herein to refer to a simple hardware logic that contains routing logic which connects multiple logic components together in a dynamic fashion. In this example, the crossbar may dynamically connect the normalisation logic 2510, the pooling logic 2512 and/or the output interleave logic 2514 depending on which layers will be processed in the current hardware pass. Accordingly, the crossbar may receive information each pass indicating which logic components 2510, 2512, 2514 are to be connected.

The pooling logic 2512 is configurable to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave logic 2514 may receive the normalised data from the normalisation logic 2510, the input data to the normalisation function (via the normalisation logic 2510), or the pooled data from the pooling logic 2512. In some cases, the data may be transferred between the normalisation logic 2510, the pooling logic 2512 and the output interleave logic 2514 via a crossbar 2518. The output interleave logic 2514 is configured to perform a rearrangement operation to produce data that is in a predetermined order. This may comprise sorting and/or transposing the received data. The data generated by the last of the layers is provided to the output logic 2515 where it is converted to the desired output format for the current hardware pass.

The normalisation logic 2510, the pooling logic 2512, and the output interleave logic 2514 may each have access to a shared buffer 2520 which can be used by these logic components 2510, 2512 and 2514 to write data to and retrieve data from. For example, the shared buffer 1420 may be used by these logic components 2510, 2512, 2514 to rearrange the order of the received data or the generated data. For example, one or more of these logic components 2510, 2512, 2514 may be configured to write data to the shared buffer 2520 and read the same data out in a different order. In some cases, although each of the normalisation logic 2510, the pooling logic 2512 and the output interleave logic 2514 have access to the shared buffer 2520, each of the normalisation logic 2510, the pooling logic 2512 and the output interleave logic 2514 may be allotted a portion of the shared buffer 2520 which only they can access. In these cases, each of the normalisation logic 2510, the pooling logic 2512 and the output interleave logic 2514 may only be able to read data out of the shared buffer 2520 that they have written into the shared buffer 2520.

The logic components of the DNN accelerator 2500 that are used or active during any hardware pass are based on the layers that are processed during that hardware pass. In particular, only the logic components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the DNN accelerator may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first hardware convolution needs to be written out to memory before it can be used as an input to the second. In each of these hardware passes only the logic components, or engines relevant to a convolution layer, such as the convolution engine 2502 and the accumulation buffer 2504, may be used or active.

Although not shown in FIG. 25, the DNN accelerator 2500 may also comprise a memory management module, as described above, which is configured to read from the input logic 2501 and write to the output logic 2515.

Although the DNN accelerator 2500 of FIG. 25 illustrates a particular order in which the logic components, engines etc. are arranged and thus how the processing of data flows through the DNN accelerator, it will be appreciated that this is an example only and that in other examples the logic components, engines may be arranged in a different manner. Furthermore, other hardware logic (e.g. other DNN accelerators) may implement additional or alternative types of DNN layers and thus may comprise different logic components, engines etc.

Figure 26:
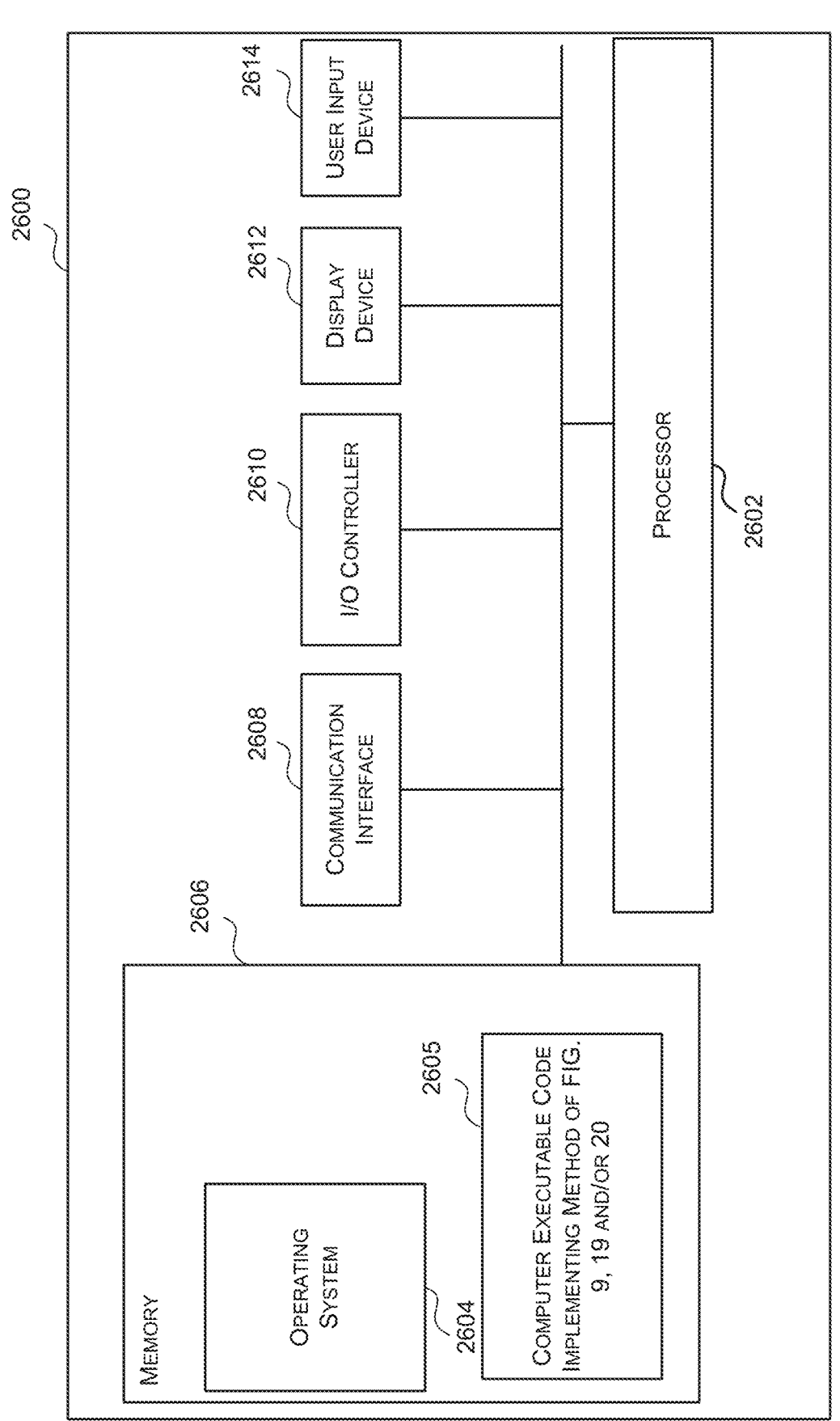
FIG. 26 is a block diagram of an example computing-based device.

FIG. 26 illustrates various components of an exemplary general purpose computing-based device 2600 which may be implemented as any form of a computing and/or electronic device, and in which embodiments of the methods 900, 1900, 2000 of FIGS. 9, 19 and 20 described above may be implemented.

Computing-based device 2600 comprises one or more processors 2602 which may be microprocessors, controllers or any other suitable type of processors for processing computer executable instructions to control the operation of the device in order to assess the performance of an integrated circuit defined by a hardware design in completing a task. In some examples, for example where a system on a chip architecture is used, the processors 2602 may include one or more fixed function blocks (also referred to as accelerators) which implement a part of the method of determining the gradients of an error of loss metric of a DNN with respect to weights of a convolution layer (rather than software or firmware). Platform software comprising an operating system 2604 or any other suitable platform software may be provided at the computing-based device to enable application software, such as computer executable code 2605 for implementing one or more of the methods 900, 1900, 2000 of FIGS. 9, 19 and 20, to be executed on the device.

The computer executable instructions may be provided using any computer-readable media that is accessible by computing-based device 2600. Computer-readable media may include, for example, computer storage media such as memory 2606 and communications media. Computer storage media (i.e. non-transitory machine readable media), such as memory 2606, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 2606) is shown within the computing-based device 2600 it will be appreciated that the storage may be distributed or located remotely and accessed via a network or other communication link (e.g. using communication interface 2608).

The computing-based device 2600 also comprises an input/output controller 2610 arranged to output display information to a display device 2612 which may be separate from or integral to the computing-based device 2600. The display information may provide a graphical user interface. The input/output controller 2610 is also arranged to receive and process input from one or more devices, such as a user input device 2614 (e.g. a mouse or a keyboard). In an embodiment the display device 2612 may also act as the user input device 2614 if it is a touch sensitive display device. The input/output controller 2610 may also output data to devices other than the display device, e.g. a locally connected printing device (not shown in FIG. 26).

Figure 27:
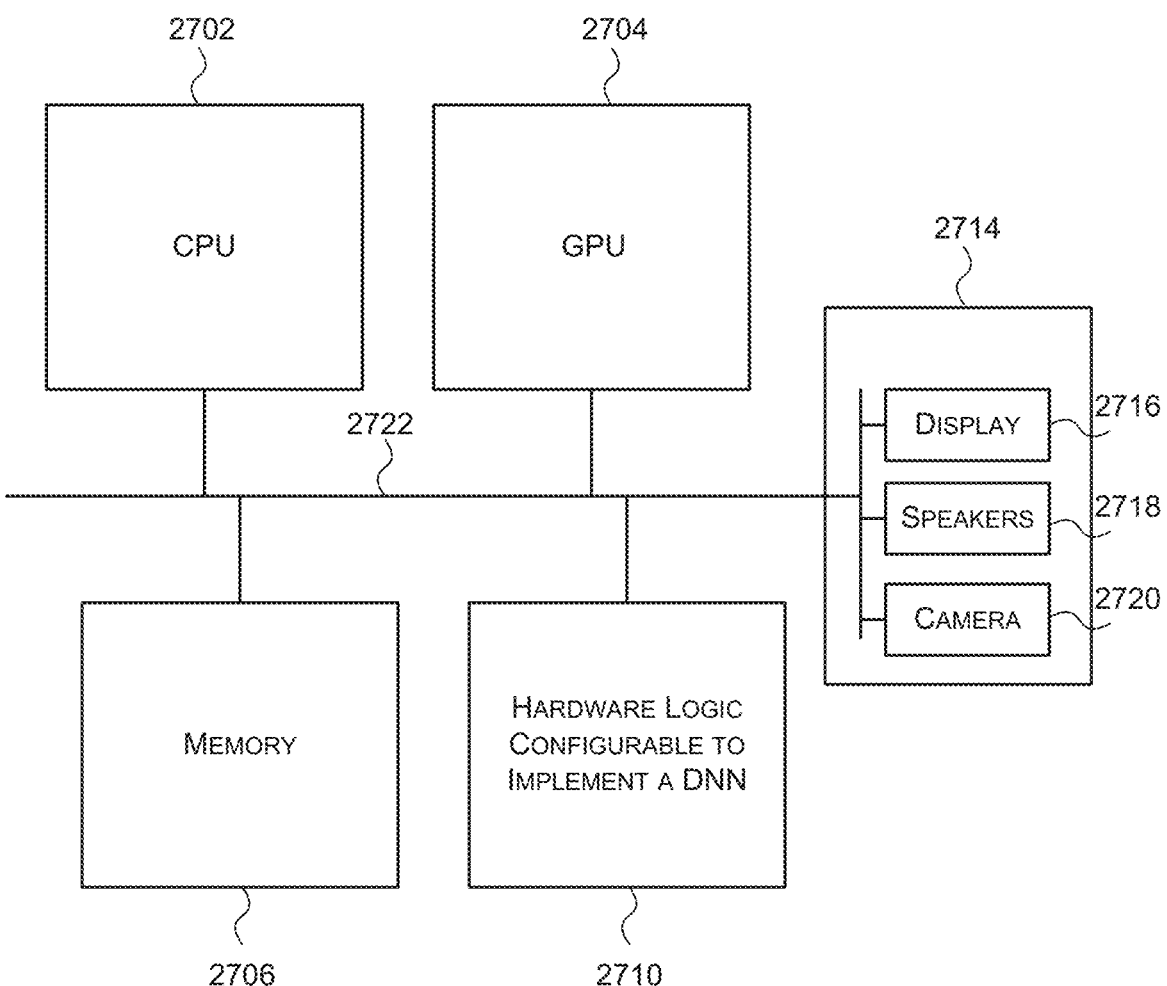
FIG. 27 is a block diagram of an example computer system in which a DNN accelerator may be implemented.

FIG. 27 shows a computer system in which the hardware logic (e.g. DNN accelerator 2500) configurable to implement a DNN described herein may be implemented. The computer system comprises a CPU 2702, a GPU 2704, a memory 2706 and other devices 2714, such as a display 2716, speakers 2718 and a camera 2720. The computer system also comprises hardware logic configurable to implement a DNN 2710 (e.g. the DNN accelerator 2500 of FIG. 25) which may receive control information from the CPU 2702 and/or the GPU 2704. The components of the computer system can communicate with each other via a communications bus 2722. In other examples, the hardware logic configurable to implement a DNN 2710 may be implemented as part of the CPU or the GPU. In some examples, there may not be a GPU.

The DNN accelerator 2500 of FIG. 25 is shown as comprising a number of functional blocks. This is schematic only and is not intended to define a strict division between different logic elements of such entities. Each functional block may be provided in any suitable manner. It is to be understood that intermediate values described herein as being formed by a DNN accelerator or a processing module need not be physically generated by the DNN accelerator or the processing module at any point and may merely represent logical values which conveniently describe the processing performed by the DNN accelerator or the processing module between its input and output.

The hardware logic configurable to implement a DNN (e.g. the DNN accelerator 2500 of FIG. 25) described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture hardware logic configurable to implement a DNN (e.g. DNN accelerator) described herein. An integrated circuit definition dataset may be, for example, an integrated circuit description.

Therefore, there may be provided a method of manufacturing, at an integrated circuit manufacturing system, hardware logic configurable to implement a DNN (e.g. DNN accelerator 2500 of FIG. 25) as described herein. Furthermore, there may be provided an integrated circuit definition dataset that, when processed in an integrated circuit manufacturing system, causes the method of manufacturing hardware logic configurable to implement a DNN (e.g. DNN accelerator 2500 of FIG. 25) to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

Figure 28:
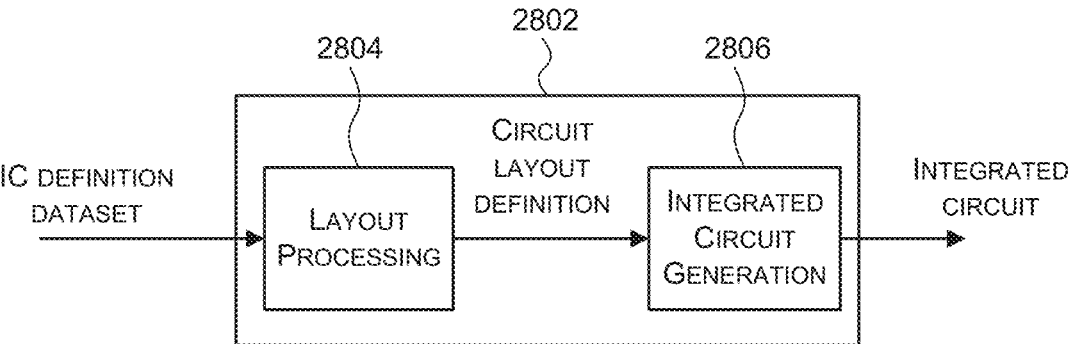
FIG. 28 is a block diagram of an example integrated circuit manufacturing system for generating an integrated circuit embodying a DNN accelerator as described herein.

An example of processing an integrated circuit definition dataset at an integrated circuit manufacturing system so as to configure the system to manufacture hardware logic configurable to implement a DNN (e.g. DNN accelerator) will now be described with respect to. FIG. 28

FIG. 28 shows an example of an integrated circuit (IC) manufacturing system 2802 which is configured to manufacture hardware logic configurable to implement a DNN (e.g. DNN accelerator) as described in any of the examples herein. In particular, the IC manufacturing system 2802 comprises a layout processing system 2804 and an integrated circuit generation system 2806. The IC manufacturing system 2802 is configured to receive an IC definition dataset (e.g. defining hardware logic configurable to implement a DNN (e.g. DNN accelerator) as described in any of the examples herein), process the IC definition dataset, and generate an IC according to the IC definition dataset (e.g. which embodies hardware logic configurable to implement a DNN (e.g. DNN accelerator) as described in any of the examples herein). The processing of the IC definition dataset configures the IC manufacturing system 2802 to manufacture an integrated circuit embodying hardware logic configurable to implement a DNN (e.g. DNN accelerator) as described in any of the examples herein.

The layout processing system 2804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2804 has determined the circuit layout it may output a circuit layout definition to the IC generation system 2806. A circuit layout definition may be, for example, a circuit layout description.

The IC generation system 2806 generates an IC according to the circuit layout definition, as is known in the art. For example, the IC generation system 2806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2806 may be in the form of computer-readable code which the IC generation system 2806 can use to form a suitable mask for use in generating an IC.

The different processes performed by the IC manufacturing system 2802 may be implemented all in one location, e.g. by one party. Alternatively, the IC manufacturing system 2802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture hardware logic configurable to implement a DNN (e.g. DNN accelerator) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 28 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 28, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of generating, at a computer system comprising one or more convolution engines embodied in hardware logic, gradients of a loss metric for a neural network (NN) with respect to weights of a convolution layer of the NN, the convolution layer of the NN configured to receive an input tensor of input values and a weight tensor of weights, and generate an output tensor of output values, the method comprising:

performing, using the one or more convolution engines, a group convolution between a first y-dimensional tensor and a second z-dimensional tensor wherein $z=y+1$, the first y-dimensional tensor being formed of a set of values from the input tensor, and the second z-dimensional tensor being formed of a set of values from an output gradient tensor comprising gradients of the loss metric for the NN with respect to the output values;

wherein the first y-dimensional tensor, the second z-dimensional tensor and the group convolution are used to generate an output of a convolution operation between each channel of the set of values of the input tensor and each channel of the set of values of the output gradient tensor.

2. The method of claim 1, wherein:

the first y-dimensional tensor comprises G channels, G being a number of channels of the set of values of the input tensor, and each channel of the first y-dimensional tensor corresponds to a channel of the set of values of the input tensor.

3. The method of claim 2, wherein:

the second z-dimensional tensor comprises C*L filters that comprises C copies of each channel of the set of values of the output gradient tensor, and C is a number of channels of the set of values of the input tensor and Z is a number of channels of the set of values of the output tensor.

4. The method of claim 3, wherein:

the second z-dimensional tensor comprises C*L filters and the $i^{th}$ filter comprises the $k^{th}$ channel of the set of values of the output gradient tensor, i is any integer in the set 0 to C*L−1, C is a number of channels of the set of values of the input tensor, L is a number of channels of the set of values of the output tensor, and k is equal to i modulo L.

5. The method of claim 4, further comprising generating the second z-dimensional tensor by:

receiving the set of values of the output gradient tensor;

expanding the set of values of the output gradient tensor to a z-dimensional tensor of filters by making each a channel of the set of values of the output gradient tensor a separate filter; and generating the second z-dimensional tensor by tiling the z-dimensional tensor of filters C times in the filter dimension such that the second z-dimensional tensor comprises C*L filters.

6. The method of claim 2, further comprising reshaping an output of the group convolution to generate a reshaped tensor, wherein reshaping a tensor of o dimensions comprises converting the tensor into a reshaped tensor of o+1 dimensions by splitting a dimension of the tensor.

7. The method of claim 1, wherein:

the first y-dimensional tensor comprises C*L channels that comprises L copies of each channel of the set of values of the input tensor, C is a number of channels of the set of values of the input tensor, and L is a number of channels of the set of values of the output gradient tensor.

8. The method of claim 7, wherein the second z-dimensional tensor comprises C*L filters that comprise C copies of each channel of the set of values of the output gradient tensor.

9. The method of claim 1, wherein:

the first y-dimensional tensor comprises C*L channels and the $g^{th}$ channel comprises the $h^{th}$ channel of the set of values of the input tensor, g is any integer in the set 0 to (C*L)−1, C is a number of channels in the set of values of the input tensor, L is a number of channels in the set of values of the output gradient tensor, and h is g modulo L.

10. The method of claim 8, further comprising generating the first y-dimensional tensor by tiling the set of values of the input tensor L times along a channel dimension.

11. The method of claim 8, wherein:
the second z-dimensional tensor comprises C*L filters and the $i^{th}$ filter comprises the $k^{th}$ channel of the set of values of the output gradient tensor,
i is any integer in the set 0 to (C*L)−1 and
k is equal to $$\left\lfloor \frac{i}{C} \right\rfloor.$$

12. The method of claim 11, further comprising generating the second z-dimensional tensor by:
receiving the set of values of the output gradient tensor;
expanding the set of values of the output gradient tensor to a z-dimensional tensor of filters by making each channel of the set of values of the output gradient tensor a separate filter; and
generating the second z-dimensional tensor by repeating each filter of the z-dimensional tensor of filters C times in the filter dimension such that the second z-dimensional tensor comprises C*L filters.

13. The method of claim 11, further comprising reshaping the output of the group convolution to generate a reshaped tensor, wherein reshaping a tensor of o dimensions comprises converting the tensor into a reshaped tensor of o+1 dimensions by splitting a dimension of the tensor.

14. The method of claim 1, wherein the convolution layer implements a 2D convolution, the input tensor is three-dimensional, the output tensor is three-dimensional, y is three, and z is four.

15. The method of claim 1, wherein the convolution layer implements a 1D convolution, the first y-dimensional tensor is generated from values of the input tensor with a dummy dimension, and the second z-dimensional tensor is generated from values of the weight tensor with a dummy dimension.

16. The method of claim 1, wherein the convolution layer implements a ZD convolution and Z is greater than or equal to three, and the method further comprises:
representing the ZD convolution as a set of 2D convolutions and summations, each 2D convolution processing a slice of the input tensor and a slice of the weight tensor and contributing to a slice of the output tensor;

performing the group convolution for each 2D convolution, wherein the set of values of the input tensor comprises the values of the input tensor corresponding to the slice of the input tensor processed by the 2D convolution, and the set of values of the output gradient tensor comprises the values of the output gradient tensor corresponding to the slice of the output tensor to which the 2D convolution contributes; and
combining the output of the group convolutions in which the corresponding 2D convolutions process the same slice of the weight tensor.

17. A method of training a neural network (NN), the method comprising:
determining an output of the NN in response to training data;
determining a loss metric based on the output of the NN;
determining gradients of the loss metric with respect to the output values of a convolution layer of the NN;
determining the gradients of the loss metric with respect to weights of the convolution layer in accordance with the method as set forth in claim 1; and
adjusting the weights of the convolution layer based on the gradients of the loss metric with respect to the weights.

18. The method of claim 17, wherein determining the gradients of the loss metric with respect to the output values of the convolution layer of the NN comprises generating an input gradient tensor for a second convolution layer of the NN that follows the convolution layer in the NN, the input gradient tensor comprising gradients of the loss metric with respect to input data values of an input tensor for the second convolution layer by:
dividing each filter of a weight tensor K of the second convolution layer into a plurality of sub-filters;
performing a convolution operation between each sub-filter and an output gradient tensor for the second convolution layer to generate a sub-output tensor; and
interleaving elements of the sub-output tensors related to the same filter to generate a channel of the input gradient tensor.

19. A non-transitory computer readable storage medium having stored thereon computer readable instructions that, when executed at a computer system, cause the computer system to perform the method as set forth in claim 1.

* * * * *